United States Patent
Haah et al.

(10) Patent No.: US 10,846,608 B2
(45) Date of Patent: Nov. 24, 2020

(54) CODES AND PROTOCOLS FOR DISTILLING T, CONTROLLED-S, AND TOFFOLI GATES

(71) Applicant: Microsoft Technology Licensing, LLC, Redmond, WA (US)

(72) Inventors: Jeongwan Haah, Redmond, WA (US); Matthew Hastings, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 15/982,988

(22) Filed: May 17, 2018

(65) Prior Publication Data

US 2019/0080254 A1     Mar. 14, 2019

Related U.S. Application Data

(60) Provisional application No. 62/555,800, filed on Sep. 8, 2017.

(51) Int. Cl.
| | | |
|---|---|---|
| *G06N 10/00* | (2019.01) | |
| *G09C 1/00* | (2006.01) | |
| *H04L 9/08* | (2006.01) | |
| *G06F 11/00* | (2006.01) | |

(52) U.S. Cl.
CPC ......... *G06N 10/00* (2019.01); *G06F 11/004* (2013.01); *G09C 1/00* (2013.01); *H04L 9/0858* (2013.01); *G06F 2201/82* (2013.01); *H04L 2209/34* (2013.01)

(58) Field of Classification Search
CPC ... G06N 10/00; G06F 11/004; G06F 2201/82; H04L 2209/34; H04L 9/0858; G09C 1/00
See application file for complete search history.

(56) References Cited

U.S. PATENT DOCUMENTS

| | | | |
|---|---|---|---|
| 9,018,971 B2 | 4/2015 | Eastin | |
| 10,404,287 B2 | 9/2019 | Haah et al. | |
| 2010/0251049 A1 | 9/2010 | Goto et al. | |
| 2015/0115998 A1* | 4/2015 | Eastin | H03K 19/195 326/7 |
| 2019/0386685 A1 | 12/2019 | Haah et al. | |

OTHER PUBLICATIONS

Crooks, "Gates, States and Circuits: Notes on the circuit model of quantum computation," Jun. 3, 2020, Tech Note 014v4, pp. 1-14 (Year: 2020).*

(Continued)

*Primary Examiner* — Guy J Lamarre
(74) *Attorney, Agent, or Firm* — Klarquist Sparkman, LLP

(57) ABSTRACT

This application concerns quantum computing and quantum circuits. For example, among the embodiments disclosed herein are codes and protocols to distill T, controlled-S, and Toffoli (or CCZ) gates for use in croantum circuits. Examples of the disclosed codes use lower overhead for a given target accuracy relative to other distillation techniques. In some embodiments, a magic state distillation protocol is generated for creating magic states in the quantum computing device, wherein the magic state distillation protocol includes (a) Reed-Muller codes, or (b) punctured Reed-Muller codes. The quantum computing device can then configured to implement the magic state distillation protocol.

16 Claims, 9 Drawing Sheets

(56) References Cited

OTHER PUBLICATIONS

Communication pursuant to Rules 161(1) and 162 EPC dated Mar. 17, 2020, from European Patent Application No. 18750277.8, 3 pp.
Cambell et al., "Magic State Distillation in All Prime Dimensions using Quantum Reed-Muller Codes," arXiv:1205.3104v2, 18 pp. (Jul. 2012).
Haah, "Towers of Generalized Divisible Quantum Codes," arXiv:1709.08658v1, 24 pp. (Sep. 2017).
International Search Report and Written Opinion dated Jun. 21, 2018, from International Patent Application No. PCT/US18/022277, 14 pp.
International Search Report and Written Opinion dated Oct. 9, 2018, from International Patent Application No. PCT/US2018/039636, 15 pp.
Kubica et al., "Universal tranversal gates with color codes—a simplified approach," Physical Review A, vol. 91, Issue 3, pp. 1-13 (Mar. 2015).
Office Action dated Oct. 12, 2018, from U.S. Appl. No. 15/627,190, 9 pp.
Watrous, "Lecture 17: General quantum errors; CSS codes," Quantum Computation, pp. 1-7 (Mar. 2006).
Yoder et al., "Universal Fault-Tolerant Gates on Nondegenerate Stabilizer Codes," arXiv:1603.03948v1, 19 pp. (Mar. 2016).
Aleksander et al., "Universal transversal gates with color codes—a simplified approach," Journal of Physical Rev. A, vol. 91, pp. 1-13 (Mar. 2015).
Alon, The Probabilistic Method, Wiley-Interscience, 373 pp. (Apr. 2004).
Berlekamp et al., "Restrictions on Weight Distribution of Reed-Muller Codes," Information and Control, vol. 14, pp. 442-456 (May 1969).
Bombin et al., "Topological Quantum Distillation," Physical Review Letters, vol. 97, pp. 1-4 (Oct. 2006).
Bravyi et al., "Double Color Codes," arXiv:1509.03239v1, pp. 1-53 (Sep. 2015).
Bravyi et al., "Magic-state distillation with low overhead," Physical Review A, vol. 86, pp. 1-10 (Nov. 2012).
Bravyi et al., "Majorana fermion codes," New Journal of Physics, vol. 12, pp. 1-23 (Aug. 2010).
Bravyi et al., "Universal quantum computation with ideal Clifford gates and noisy ancillas," Physical Review A, vol. 71, pp. 1-15 (Feb. 2005).
Calderbank et al., "Good quantum error-correcting codes exist," Physical Review A, vol. 54, pp. 24 (Aug. 1996).
Calderbank et al., "Quantum Error Correction and Orthogonal Geometry," Physical Review Letters, vol. 78, pp. 1-4 (Jan. 1997).
Campbell et al., "An efficient magic state approach to small angle rotations," Quantum Science and Technology, vol. 1, pp. 1-16 (Dec. 2016).
Campbell et al., "A unified framework for magic state distillation and multiqubit gate-synthesis with reduced resource cost," Physical Review A, vol. 95, pp. 1-23 (Feb. 2017).
Duclos-Cianci et al., "Reducing the quantum computing overhead with complex gate distillation," Physical Review A, vol. 91, pp. 1-9 (Apr. 2015).
Eastin, "Distilling one-qubit magic states into Toffoli states," Physical Review A, vol. 87, pp. 1-8 (Mar. 2013).
Gottesman, "A Class of Quantum Error-Correcting Codes Saturating the Quantum Hamming Bound," Physical Review A, vol. 54, pp. 1-22 (Sep. 1996).
Grassi et al., "Quantum BCH Codes," Int'l Symp. on Theoretical Electrical Engineering, pp. 207-212 (Oct. 1999).
Haah et al., "Magic State Distillation with Low Space Overhead and Optimal Asymptotic Input Count," Quantum Journal, vol. 1, pp. 1-48 (Mar. 2017).
Hastings, "Small Majorana Fermion Codes," Quantum Information & Computation, vol. 17, pp. 1-11 (Nov. 2017).
Jones, "Composite Toffoli gate with two-round error detection," Physical Review A, vol. 87, pp. 1-8 (May 2013).
Jones, "Multilevel distillation of magic states for quantum computing," Physical Review A, vol. 87, pp. 1-10 (Apr. 2013).
Jones, "Novel constructions for the fault-tolerant Toffoli gate," Physical Review A, vol. 87, pp. 1-5 (2013).
Karzig et al., "Scalable designs for quasiparticle-poisoning-protected topological quantum computation with Majorana zero modes," Physical Review B, vol. 95, pp. 1-32 (Jun. 2017).
Knill, "Fault-Tolerant Postselected Quantum Computation: Schemes," arXiv:quant-ph/0402171v1, pp. 1-17 (Feb. 2004).
Knill, "Fault-Tolerant Postselected Quantum Computation: Threshold Analysis," arXiv:quant-ph/0404104v1, pp. 1-21 (Apr. 2004).
Landahl et al., "Complex instruction set computing architecture for performing accurate quantum Z rotations with less magic," arXiv:1302.3240v2, pp. 1-13 (Feb. 2013).
Meier et al., "Magic-state distillation with the four-qubit code," Quantum Information & Computation, vol. 13, pp. 1-10 (Mar. 2013).
Moser et al., "A Constructive Proof of the General Lovasz Local Lemma," ACM, vol. 57, pp. 1-15 (Jan. 2010).
Sloane et al., "Weight Enumerator for Second-Order Reed-Muller Codes," IEEE Trans. on Information Theory, vol. IT-16, pp. 745-751 (Nov. 1970).
U.S. Appl. No. 15/627,190, filed Jun. 19, 2017, 140 pp.
Vijay et al., "Quantum Error Correction for Complex and Majorana Fermion Qubits," arXiv:1703.00459v1, pp. 1-11 (Mar. 2017).
Ward, "Weight Polarization and Divisibility," Discrete Mathematics, vol. 83, pp. 315-326 (Aug. 1990).

\* cited by examiner

500 
Generate a Reed-Muller magic state distillation protocol for creating magic states in the quantum computing device - 510
Configure the quantum computing device to implement the Reed-Muller magic state distillation protocol - 512
FIG. 5

600 

```
┌─────────────────────────────┐
│ Generate a magic state      │
│ distillation protocol for T │
│ gates, controlled-S gates,  │
│ or CCZ gates using a        │
│ randomized construction     │
│ process - 610               │
└─────────────────────────────┘
              │
              ▼
┌─────────────────────────────┐
│ Configure the quantum       │
│ computing device to         │
│ implement the magic state   │
│ distillation protocol - 612 │
└─────────────────────────────┘
```

Generate a magic state distillation protocol for T gates, controlled-S gates, or CCZ gates, wherein the magic state distillation protocol includes level-lifted triorthogonal codes for reducing circuit depth - 710

Configure the quantum computing device to implement the magic state distillation protocol - 712

Measure a controlled-Z operator using a transversal T gate to measure stabilizers of a CCZ magic state - 810

Simultaneously measure stabilizers of CCZ magic states using one or more transversal CCZ gates - 910

1000

```
Generate a magic state distillation protocol
for T gates, wherein the magic state
distillation protocol includes punctured
Reed-Muller codes - 1010
```

```
Configure the quantum computing device to
implement the magic state distillation
protocol - 1012
```

1100

Generate a magic state distillation protocol using only $k+n_X$ total qubits - 1110

Configure the quantum computing device to implement the magic state distillation protocol - 1112

CODES AND PROTOCOLS FOR DISTILLING T, CONTROLLED-S, AND TOFFOLI GATES

CROSS-REFERENCE TO RELATED APPLICATIONS

This application claims the benefit of U.S. Provisional Application No. 62/555,800, filed on Sep. 8, 2017, and entitled "CODES AND PROTOCOLS FOR DISTILLING T, CONTROLLED-S, AND TOFFOLI GATES," which is hereby incorporated herein by reference in its entirety.

FIELD

Thus application concerns quantum computing and quantum circuits. For example, among the embodiments disclosed herein are codes and protocols to distill T, controlled-S, and Toffoli (or CCZ) gates for use in quantum circuits.

SUMMARY

Many schemes for quantum computation rely on first implementing a set of operations called the Clifford operations. These operations do not suffice for universal quantum computation, and so these schemes then implement additional operations, such as T-gates (rotation by angle pi/8), Toffoli gates (a reversible version of the AND gate), controlled-S gates (a controlled phase gate with pure imaginary phase) or other non-Clifford operations. The implementation of these additional operations is equivalent to being able to produce a certain resource, called a magic state: using a magic state, one can produce one of these operations and vice-versa. These additional operations are typically implemented with limited accuracy in the physical hardware, and so it is desirable to use some method to increase this accuracy. A typical method, called distillation, uses several low quality magic states to produce a smaller number of high quality magic states.

In this disclosure, improved codes are described for the distillation of these slates for T gates, controlled-S gates, and Toffoli gates. Examples of these codes use lower overhead for a given target accuracy relative to other distillation techniques.

In certain embodiments, a Reed-Muller magic state distillation protocol is generated for creating magic states in the quantum computing device, and the quantum computing device is configured to implement the Reed-Muller magic state distillation protocol. In particular implementations, the Reed-Muller magic state distillation protocol is for Toffoli gates or controlled-controlled-Z (CCZ) gates. In some implementations, logical vectors implemented by the protocol allow 10 CCZ magic states for 512 qubit code with eighth order error reduction. In certain implementations, the protocol uses R-M stabilizers as shown and described herein.

In some embodiments, a magic state distillation protocol for T gates, controlled-S gates, or CCZ gates is generated using a randomized construction process, and the quantum computing device is configured to implement the magic state distillation protocol. In certain implementations, the magic state distillation protocol has an asymptotic distillation efficiency $\gamma \to 1$.

In particular embodiments, a magic state distillation protocol for T gates, controlled-S gates, or CCZ gates is generated, wherein the magic state distillation protocol includes triorthogonal codes for reducing circuit depth, and the quantum computing device is configured to implement the magic state distillation protocol.

In certain embodiments, a controlled-Z operator using a transversal T gate are measured to measure stabilizers of a CCZ magic state. In certain implementations, the stabilizers of the CCZ magic state achieve a second order error reduction. Further, the stabilizers of the CCZ magic state achieve a fourth order error reduction.

In some embodiments, stabilizers of CCZ magic states using one or more transversal CCZ gates are simultaneously measured. In certain implementations, the stabilizers of the CCZ magic state achieve a fourth order error reduction.

In particular embodiments, a magic state distillation protocol for T gates is generated, wherein the magic state distillation protocol includes punctured Reed-Muller codes, and the quantum computing device is configured to implement the magic state distillation protocol. In particular implementations, the punctured Reed-Muller codes comprise any of the Reed-Muller codes as disclosed herein. In further implementations, the punctured Reed-Muller codes are punctured higher-order (above first-order) Reed-Muller codes as disclosed herein. In certain implementations, the punctured Reed-Muller codes are selected based on Hamming distances.

In some embodiments, a magic state distillation protocol is generated using only $k+n_X$ total qubits, and the quantum computing device is configured to implement the magic state distillation protocol. In particular implementations, the magic state distillation protocol is based on a triorthogonal code.

Any features or aspects of the disclosed embodiments can be used in various combinations and subcombinations with one another. For example, one or more method acts or features from one embodiment can be used with one or more method acts or features from another embodiment and vice versa. The foregoing and other objects, features, and advantages of the invention will become more apparent from the following detailed description, which proceeds with reference to the accompanying figures.

BRIEF DESCRIPTION OF THE DRAWINGS

FIG. 5 is a flowchart of an example method for distilling magic states in a quantum computing device in accordance with embodiments of the disclosed technology.

FIG. 6 is another flowchart of an example method for distilling magic states in a quantum computing device in accordance with embodiments of the disclosed technology.

DETAILED DESCRIPTION

I. General Considerations

Figure 1:
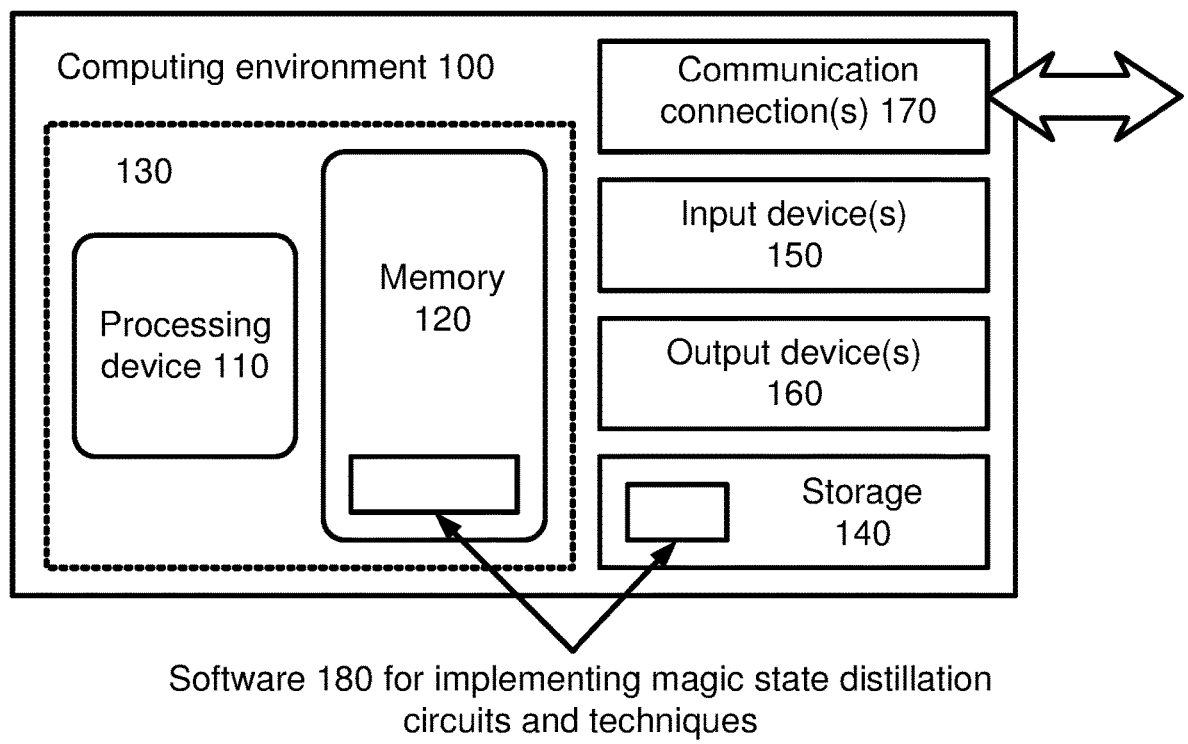
FIG. 1 illustrates a generalized example of a suitable computing environment in which several of the described embodiments can be implemented.

Disclosed herein are representative embodiments of methods, apparatus, and systems for magic state distillation in quantum computing devices, including quantum computing circuit architectures for performing such distillation.

Any of the disclosed example embodiments can be performed by a system comprising a classical processor and memory and/or at least in part by a quantum computing device (quantum computer) itself. The disclosed methods, apparatus, and systems should not be construed as limiting in any way. Instead, the present disclosure is directed toward all novel and nonobvious features and aspects of the various disclosed embodiments, alone or in various combinations and subcombinations with one another. Furthermore, any features or aspects of the disclosed embodiments can be used in various combinations and subcombinations with one another. For example, one or more method acts or features from one embodiment can be used with one or more method acts or features from another embodiment and vice versa. The disclosed methods, apparatus, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Further, some of the methods described herein can be altered by changing the ordering of the method acts described, by splitting, repeating, or omitting certain method acts, etc. Moreover, for the sake of simplicity, the attached figures may not show the various ways in which the disclosed methods can be used in conjunction with other methods. Additionally, the description sometimes uses terms like "evaluate", "determine", or "choose" to describe the disclosed technology. Such terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, as used herein, the term "and/or" means any one item or combination of any items in the phrase.

II. Overview of Disclosed Technology

Magic state distillation is an approach to implementing a universal quantum computer. See, e.g., E. Knill, "Fault-tolerant postselected quantum computation: Schemes," (2004), quant-ph/0402171v1; E. Knill, "Fault-tolerant postselected quantum computation: Threshold analysis," (2004), quantph/0404104v1; Sergei Bravyi and Alexei Kitaev, "Universal quantum computation with ideal Clifford gates and noisy ancillas," Phys. Rev. A 71, 022316 (2005), quant-ph/0403025. This approach begins by implementing the Clifford group to high accuracy using either stabilizer codes (e.g., Daniel Gottesman, "A class of quantum error-correcting codes saturating the quantum hamming bound," Phys. Rev. A 54, 1862 (1996), quant-ph/9604038; A. R. Calderbank, E. M Rains, P. W. Shor, and N. J. A. Sloane, "Quantum error correction and orthogonal geometry," Phys. Rev. Lett. 78, 405-408 (1997), a t-ph/9605005) or using Majorana fermions. See Torsten Karzig, Christina Knapp, Roman M Lutchyn, Parsa Bonderson, Matthew B Hastings, Chetan Nayak, Jason Alicea, Karsten Flensberg, Stephan Plugge, Yuval Oreg, et al., "Scalable designs for quasiparticle-poisoning-protected topological quantum comnputation with majorana zero modes," Physical Review B 95, 235305 (2017). Then, to obtain universality, some non-Clifford operation is necessary, such as the $\pi/4$-rotation (T-gate) or the Toffoli gate (or CCZ which is equivalent to Toffoli up to conjugation by Cliffords). These non-Clifford operations are implemented using a resource, called a magic state, which is injected into a circuit that uses only Clifford operations.

Since these magic states can produce non-Clifford operations, they cannot themselves be produced by Clifford operations. Instead, in distillation, the Clifford operations are used to distill a small number of high accuracy magic states from a larger number of low quality magic state. There are many distillation protocols for the magic state for T gates (see, e.g., E. Knill, "Fault-tolerant postselected quantum computation: Schemes," (2004), quant-ph/0402171v1; Sergei Bravyi and Alexei Kitaev, "Universal quantum computation with ideal Clifford gates and noisy ancillas," Phys. Rev. A 71, 022316 (2005), quant-ph/0403025; Adam M. Meier, Bryan Eastin, and Emanuel Knill, "Magic-state distillation with the four-qubit code," Quant. Inf. Comp. 13, 195 (2013), 1204.4221; Sergey Bravyi and Jeongwan Haah, "Magic-state distillation with low overhead," Physical Review A 86, 052329 (2012); Cody Jones, "Multilevel distillation of magic states for quantum computing," Phys. Rev. A 87, 042305 (2013), 1210.3388v2; Jeongwan Haah, Matthew B. Hastings, D. Poulin, and D. Wecker, "Magic state distillation with low space overhead and optimal asymptotic input count," 1703.07847v1), as well as some protocols (see, e.g., Bryan Eastin, "Distilling one-qubit magic states into toffoli states," Physical Review A 87, 032321 (2013), 1212.4872; Cody Jones, "Low-overhead constructions for the fault-tolerant toffoli gate," Physical Review A 87, 022328 (2013), 1212.5069) to distill magic states for Toffoli gates from T-gates.

In such distillation architectures, the resources (e.g., space, number of Clifford operations, and number of noisy non-Clifford operations) required to distill magic states far exceed the resources required to implement most quantum algorithms using these magic states. Hence, improvements in distillation efficiency can greatly impact the total resource cost.

This disclosure presents a variety of improvements in magic state distillation. One exemplary theme in this disclosure is exploring various protocols to distill magic states for Toffoli, controlled-S, as well as T-gates. Several approaches to this are presented. In some embodiments, a generalization of triorthogonal codes is used to allow this distillation. See Sergey Bravyi and Jeongwan Haah, "Magic-state distillation with low overhead," Physical Review A 86, 052329 (2012). In section IV, a randomized construction of such codes is given which achieves distillation efficiency $\gamma \to 1$; this approach is of interest because not only is the distance of the code fairly large (of order square-root number of qubits) but also the least weight stabilizer has comparable weight. In section V, another approach based on Reed-Muller codes is disclosed. In addition to theoretical asymptotic results here, a particularly striking code is disclosed which distills 512 T-gates into 10 CCZ magic states while obtaining eight order reduction in error. In particular, a 512 T-gate to 10 Toffoli gate code with distance 8 is disclosed as well as triorthogonal codes with parameters [[887, 137, 5]], [[912, 112, 6]], [[937, 87, 7]] with very low prefactors in front of the leading order error terms in those codes.

Also presented herein are approaches to distilling Toffoli states which are not based on a single triorthogonal (or generalized triorthogonal code) but rather on implementing a protocol using a sequence of checks. As in Jeongwan Haah, Matthew B. Hastings, D. Poulin, and D. Wecker, "Magic state distillation with low space overhead and optimal asymptotic input count," 1703.07847v1, inner codes are used to measure various stabilizers of the magic state. Two different methods of doing this are presented, one based on hyperbolic inner codes in section VI and one based on normal inner code in section VII (hyperbolic and normal codes were called even and odd inner codes, respectively, in a version of Jeongwan Haah, Matthew B. Hastings, D. Poulin, and D. Wecker, "Magic state distillation with low space overhead and optimal asymptotic input count," 1703.07847v1).

In addition to these results for distilling Toffoli states, other results useful specifically for distilling T-gates are presented. In particular, in VE punctured Reed-Muller codes are studied and some protocols are disclosed with a better ratio of input T-gates to output T-gates than any other known protocol for certain orders of error reduction. Another result in III D is a method of reducing the space required for any protocol based on triorthogonal codes at the cost of increased depth.

Matrices $S = \mathrm{diag}(1, i)$, and $T = \mathrm{diag}(1, e^{i\pi/4})$ are used.

III. Triorthogonal Matrices: Definitions and Generalizations

A. Definitions

Codes with n bits are considered, so that code words are vectors in $\mathbb{F}_2^n$. Given a vector $\vec{u}$, let $|\vec{u}|$ denote the Hamming weight (the number of nonzero entries of $\vec{u}$). Given a vector $\vec{u}$, let $\vec{u}_i$ denote the i-th entry of $\vec{u}$. Given two vectors $\vec{u}, \vec{v}$, let $\vec{u} \wedge \vec{v}$ denote the entry wise product of $\vec{u}$ and $\vec{v}$, i.e., $(\vec{u} \wedge \vec{v})_i = \vec{u}_i \vec{v}_i$. Let $\vec{u} \cdot \vec{v}$ denote the inner product, so that $\vec{u} \cdot \vec{v} = \Sigma_i \vec{u}_i \vec{v}_i$, where the sum is taken modulo 2.

Here, a code $\mathcal{C}$ refers to a linear subspace of $\mathbb{F}_2^n$. Given two codes $\mathcal{C}, \mathcal{D}$, let $\mathcal{C} \wedge \mathcal{D}$ denote the subspace spanned by vectors $\vec{u} \wedge \vec{v}$ for $\vec{u} \in \mathcal{C}$ and $\vec{v} \in \mathcal{D}$. Given a code $\mathcal{C}$, let $\mathcal{C}^\perp$ denote the dual code, e.g. for any vector $\vec{v}$, $\vec{v} \in \mathcal{C}^\perp$ if and only if $\vec{v} \cdot \vec{u} = 0$ for all $\vec{u} \in \mathcal{C}$. Given two codes $\mathcal{C}, \mathcal{D}$, let $\mathrm{span}(\mathcal{C}, \mathcal{D})$ denote the span of $\mathcal{C}$ and $\mathcal{D}$.

Following Bravyi and Haah (see Sergey Bravyi and Jeongwan Haah, "Magic-state distillation with low overhead," Physical Review A 86, 052329 (2012), a binary matrix G of size m-by-n is called triorthogonal if $$\sum_{j=1}^{n} G_{a,j} G_{b,j} = 0 \bmod 2, \tag{III.1}$$

for all pairs $1 \leq a < b \leq m$, and $$\sum_{j=1}^{n} G_{a,j} G_{b,j} G_{c,j} = 0 \bmod 2, \tag{III.2}$$

for all triples of rows $1 \leq a < b < c \leq m$.

Further, it will be assumed that the first $k_T$ rows of G have odd weight, specifically $\Sigma_{j=1}^{n} G_{a,j} = 1 \bmod 2$ for $1 \leq a \leq k_T$ and the remaining rows have even weight, specifically, $\Sigma_{j=1}^{n} G_{a,j} = 0 \bmod 2$ for $k_T + 1 \leq a \leq n$. (The notation $k_1$ instead of $k_T$ was used in Sergey Bravyi and Jeongwan Haah, "Magic-state distillation with low overhead," Physical Review A 86, 052329 (2012).) Let $$k_0 = m - k_T. \tag{III.3}$$

Let $\mathcal{G}_0$ denote the span of the even weight rows of G. Let $\mathcal{G}_T$ denote the span of the odd weight rows of G. Let $\mathcal{G}$ denote the span of all the rows of G.

The distance of a triorthogonal matrix G is defined to be the minimum weight of a vector $\vec{u}$ such that $\vec{u} \in \mathcal{G}_0^\perp$ but $\vec{u} \notin \mathcal{G}_T^\perp$. The distance of a subspace $\mathcal{C}$ is defined to be the minimum weight of a nonzero vector in that subspace. Clearly, the distance of G is at least the distance of $\mathcal{G}_0^\perp$.

B. Triorthogonal Spaces and Punctured Triorthogonal Matrices

Here, a "triorthogonal subspace" is a subspace $\mathcal{C}$ such that for any $\vec{u}, \vec{v}, \vec{w} \in \mathcal{C}, |\vec{u} \wedge \vec{v} \wedge \vec{w}| = 0 \bmod 2$. Given a triorthogonal matrix G, the vector space $\mathcal{G}_0$ is a triorthogonal space. Thus, any $k_0$-by-n matrix whose rows span $\mathcal{G}_0$ is a triorthogonal matrix. However, if $k_T \neq 0$, then the span of the rows of G is not a triorthogonal space.

In this regard, note the following. Let C be an arbitrary triorthogonal matrix of the form $$G = \begin{pmatrix} G_T \\ G_0 \end{pmatrix}, \tag{III.4}$$

where $G_T$ is $k_T$-by-n (and contains the odd weight rows of G) and $G_0$ is $k_0$-by-n (and contains the even weight rows of G). Consider the matrix $$\tilde{G} = \begin{pmatrix} I & G_T \\ 0 & G_0 \end{pmatrix}, \tag{III.5}$$

where I denotes a $k_T$-by-$k_T$ identity matrix and 0 denotes the zero matrix of size $k_0$-by-$k_T$. This matrix $\tilde{G}$ is a triorthogonal matrix with all rows having even weight, and its rows span defines a triorthogonal space $\tilde{\mathcal{G}}$. Thus, from a triorthogonal matrix, one can construct a triorthogonal space by adding $k_T$ additional coordinates to the vector and padding the matrix by I.

A converse direction is now shown based on the idea of puncturing a code. Given any subspace $\tilde{C}$ of dimension m, there exists a matrix $\tilde{G}$ whose rows form a basis of $\tilde{C}$ (after possibly permuting the coordinates of the space) such that $$\tilde{G} = (I_m \ P) = \begin{pmatrix} I_{k_T} & 0 & P_T \\ 0 & I_{k_0} & P_0 \end{pmatrix},$$

for some matrix P, where $I_m$ is an m-by-m identity matrix. Such a matrix in the reduced row echelon form is unique once an ordering of coordinate is fixed, and can be computed by Gauss elimination from any spanning set for $\tilde{C}$. Choose any $k_T$ such that $0 \le k_T \le m$. Let $P_T$ be the first $k_T$ rows of P and let $P_0$ be the remaining rows of P. Let $G_T = (0 \ P_T)$, where 0 is the $k_T$-by-$k_0$ zero matrix, and let $G_0 = (I_{k_0} \ P_0)$, where $I_{k_0}$ the $k_0$-by-$k_0$ identity matrix. Then, the matrix $$\begin{pmatrix} G_T \\ G_0 \end{pmatrix} = \begin{pmatrix} 0 & P_T \\ I_{k_0} & P_0 \end{pmatrix}$$

is a triorthogonal matrix. Here, it is said that this matrix is obtained by "puncturing" the previous code on the given coordinates. By the uniqueness of the reduced row echelon form, the matrices $G_T$ and $G_0$ are determined by $\tilde{C}$, $k_T$, and the ordering of the coordinates.

This idea of puncturing is related to the following protocol for distillation (see also, Austin G. Fowler, Matteo Mariantoni, John M. Martinis, and Andrew N. Cleland, "Surface codes: Towards practical large-scale quantum computation." Phys. Rev. A 86, 032324 (2012), 1208.0928v2). $k_T=1$ is considered for the moment, but a generalization to a larger $k_T$ can also be made. Observe that on a Bell pair $|\phi\rangle = |00\rangle + |11\rangle$ (global normalization factors are ignored), the action of T on the first qubit is the same as T on the second: $T_1|\phi\rangle = T_2|\phi\rangle$. Once one has $T_2|\phi\rangle$, suppose one measures out the second qubit onto $|+\rangle$. The state on the first qubit is then the magic state $T_1|+\rangle = \langle +_2|T_2|\phi\rangle$. If the second qubit of this Bell pair is a logical qubit of a code, where the logical T can be fault-tolerantly implemented, then the above observation enables fault-tolerant creation of the magic state. This scheme is different front preparing encoded $|+\rangle$, applying T, and inverse-encoding, in that the Clifford depth is smaller. (Note also that the projection onto $|+\rangle$ on the second qubit can be achieved by individual physical qubit measurements.) The Bell pair is the eigenstate of XX and ZZ, or $X\bar{X}$ and $Z\bar{Z}$ if the second qubit is encoded in a code where $\bar{X}$ and $\bar{Z}$ are logical operators of the code. Therefore, the Bell pair where the second qubit is encoded in a triorthogonal code is the state stabilized by X(v) for any v in a (pre-puncture) triorthogonal space $\tilde{C}$, and by Z(v') for any v' in $\tilde{C}^\perp$.

C. Generalized Triorthogonal Matrices: T-to-CCZ Distillation

Here, the definition of triorthogonal matrices is generalized. This definition has some similarity to the "synthillation" protocols of Earl T Campbell and Mark Howard, "Unified framework for magic state distillation and multi-qubit gate synthesis with reduced resource cost," Physical Review A 95, 022316 (2017), 1606.01904v3. The definition here is a special case in that only codes that distill T-gates, controlled-S gates, and CCZ gates are considered, rather than arbitrary diagonal matrices at the third level of the Clifford hierarchy. On the other hand, codes of arbitrary distance are presented, rather than just distance 2.

Definition 1. A $(k_T + 2k_{CS} + 3k_{CCZ})$-by-n, binary matrix G is generalized triorthogonal if it can be written up to permutations of rows as $$G = \begin{bmatrix} G_T \\ G_{CS} \\ G_{CCZ} \\ G_0 \end{bmatrix} \quad \text{(III.6)}$$

where $G_T$ has $k_T$ rows, $G_{CS}$ has $k_{CS}$ pairs of rows, and $G_{CCZ}$ has $k_{CCZ}$ triples of rows such that $$\sum_{i=1}^{n} G_{a,i} G_{b,i} G_{c,i} \mod 2 = \quad \text{(III.7)}$$

$$\begin{cases} 1 & \text{if } a = b = c = 1, \ldots, k_T, \\ 1 & \text{if } \begin{cases} a = b = k_T + 2i - 1, \\ c = k_T + 2i \end{cases} \text{for } i = 1, \ldots, k_{CS}, \\ 1 & \text{if } \begin{cases} a = k_T + 2k_{CS} + 3i - 2, \\ b = k_T + 2k_{CS} + 3i - 1, \text{for } i = 1, \ldots, k_{CCZ}, \\ c = k_T + 2k_{CS} + 3i \end{cases} \\ 0 & \text{otherwise.} \end{cases}$$

Such a generalized triorthogonal matrix can be used to distill n T-gates into $k_T$ T-gates, $k_{CS}$ controlled-S gates, and $k_{CCZ}$ CCZ gates, where the CCZ gate is a controlled-controlled-Z gate which is conjugate to the Toffoli gate by Clifford operations.

In this paragraph, a quantum code on n qubits is defined. Take X-type stabilizers of the quantum code which correspond to rows of $G_0$ (for each row of $G_0$, there is a generator of the stabilizer group which is a product of Pauli X on all qubits for which there is a 1 entry in that row of $G_0$). For each row of $G_T$, $G_{CS}$ and $G_{CCZ}$ there is one logical qubit, with logical X-type operators corresponding to the row. The corresponding Z-type logical operators can be determined by the requirement that they commute with the X-type stabilizers and by the commutation relations for logical X and Z operators. Finally, the Z-type stabilizers of the code are the maximal set of operators that commutes with all logical operators and X-type stabilizers. It can be shown, by generalizing the arguments of Sergey Bravyi and Jeongwan Haah, "Magic-state distillation with low overhead," Physical Review A 86, 052329 (2012), that applying a T-gate to every qubit will apply T-gates to the logical qubits corresponding to rows of $k_T$ and will apply controlled-S gates to each pair of logical qubits corresponding to a pair of rows of $G_{CS}$, and will apply CCZ gates to each triple of logical qubits corresponding to a triple of rows of $G_{CCZ}$, up to an overall Clifford operation on the logical qubits. Input errors are detected up to an order given by the distance of the code, where the distance of a generalized triorthogonal matrix G is defined to be the minimum weight of a vector $\vec{u}$ such that $\vec{u} \in \mathcal{G}_0^\perp$ and such that $\vec{u} \notin \text{span}(\mathcal{G}_T, \mathcal{G}_{CS}, \mathcal{G}_{CCZ})^\perp$, with $\mathcal{G}_{CS}, \mathcal{G}_{CCZ}$ being the row spans of $G_{CS}, G_{CCZ}$ respectively.

D. Space-Time Tradeoff for Triorthogonal Codes

Here, a way of reducing the space required in any protocol based on a triorthogonal code at the cost of increasing circuit depth is discussed. Consider a code with a total of k logical qubits ($k=k_T+2k_{CS}+3k_{CCZ}$), a total of $n_X$ X-type stabilizer generators, and $n_Z$ Z-type stabilizer generators. The number $n_X$ is equal to the number of rows of $G_0$. The usual protocol to prepare magic states is to first initialize the logical qubits in the $|+\rangle$ state, encode, then apply transversal T, measure stabilizers, and, if no error is found, finally decode yielding the desired magic states. It is possible to implement this protocol using only $k+n_X$ total qubits as follows.

The idea is to work on the unencoded state, but one can instead spread potential errors so that one can detect them. Recall that encoding is done by preparing a total of $n_X$ ancilla qubits in the $|+\rangle$ state (call these the X ancilla qubits), a total of $n_Z$ ancilla qubits in the $|0\rangle$ state (call these the Z ancilla qubits), and applying a Clifford. Call this Clifford U. Then, an equivalent protocol is: prepare a total of $n_X$ ancilla qubits in the $|+\rangle$ slate, a total of $n_Z$ ancilla qubits in the $|0\rangle$ state, and apply $\Pi_{j=1}^n U^\dagger \exp(i\pi Z_j/8)U$, then measure whether all the X ancilla qubits are still in the $|+\rangle$ state. (There is no need to check the Z ancilla qubits since the error model has Z errors only after twirling.)

The operator $U^\dagger \exp(i\pi Z_j/8)U$ is equal to $\exp(iP_j/8)$ where $P_j = U^\dagger Z_j U$, which is a product of Pauli Z operators. Let $P_j = \tilde{P}_j Q_j$ where $\tilde{P}_j$ is a product of Pauli Z operators on some set of logical qubits (which are not embedded in a code space!) and X ancilla qubits, and $Q_j$ is product of Pauli Z on some set of Z ancilla qubits. Since the Z ancilla qubits remain in the $|0\rangle$ state throughout the protocol, an equivalent protocol involving only $k+n_X$ total qubits is: prepare a total of $n_X$ ancilla qubits in the $|+\rangle$ state, and apply $\Pi_{j=1}^n \exp(i\tilde{P}_j/8)$, then measure whether all the X ancilla qubits are still in the $|+\rangle$ state. Note that although the product over j ranges from 1 to n, there are only $k+n_X < n$ physical qubits.

This operator $\exp(i\pi \tilde{P}_j/8)$ can be applied by a sequence comprising a Clifford, a T gate, and the inverse of the Clifford. Indeed, one can apply up to $k+n_X$ of these operators in parallel by finding a Clifford which conjugates each of the $k+n_X$ different choices of $\tilde{P}_j$ to Pauli Z operators on different choices of the $k+n_X$ physical qubits. Hence, one can obtain a protocol using $k+n_X$ total qubits, that requires $$\left\lceil \frac{n}{k+n_X} \right\rceil$$

rounds of Cliffords and T-gates. While the T-depth of the circuit is larger than the original protocol, the total circuit depth may or may not increase: if the Cliffords are implemented by elementary CNOT gates, then the circuit depth depends upon the depth required to implement the various encoding and decoding operations. Other tradeoffs are possible by varying the number of Z ancillas that are kept: keeping all Z ancillas is the original protocol with minimal depth and maximal space, while reducing the number will increase depth at the cost of space.

A Z error on a T gate will propagate due to the Cliffords. Specifically, a Clifford $U^{(j)}$ that maps $\exp(i\pi Z_j/8)$ to $\exp(i\pi \tilde{P}_j/8)$, will map an error $Z_j$ to $\tilde{P}_j$, but the error $\tilde{P}_j$ will not further be affected by the other $\exp(i\pi \tilde{P}_j/8)$ since they commute. The accumulated error will flip some X ancilla qubits as well as the logical qubits that would be flipped in the usual protocol. The association from the errors in T gates to the logical and X ancilla ubits is identical to the usual protocol. Hence, in the present space-time tradeoff, the output error probability and the success probability are identical to the usual protocol, whenever the error model is such that only T gates suffer from Z errors.

For example, for the 512 qubit protocol below to distill CCZ magic states based on RM(2,9), the number of physical qubits required is $$3 \times 10 + n_X = 30 + 1 + 9 + \binom{9}{2} = 76.$$

For protocols based on a punctured RM(3, 10) below, $$n_X \leq 1 + 10 + \binom{10}{2} + \binom{10}{3} = 176.$$

leading in both cases to a large reduction in space required.

IV. Randomized Constructon of Triorthogonal and Generalized Triorthogonal Matrix In this section, a randomized algorithm is disclosed that either returns a triorthogonal or generalized triorthogonal matrix with the desired n, $k_T$, $k_{CS}$, $k_{CCZ}$, $k_0$, or returns failure. For notational simplicity, one can begin with the case of $k_{CS}=k_{CCZ}=0$ (a triorthogonal matrix). It will then be explained at the end how to construct generalized triorthogonal matrices by a straightforward generalization of this algorithm.

A. Randomized Construction of Triorthogonal Matrices

The matrix is constructed as follows. The rows of the matrix are constructed iteratively, choosing each row uniformly at random subject to constraints given by previous rows. More precisely, when choosing the j-th row of the matrix, the row is uniformly chosen at random subject to constraint III.1 for b=j and for all a<j, and subject to the constraint III.2 for c=j and for all a<b<j, and subject to the constraint that the row has either even or odd weight depending on whether it is one of the first $k_T$ rows of G or not. If it is not possible to satisfy all these constraints, then the construction is terminated and declared a failure. Otherwise, the algorithm is continued. If the constraints are satisfied for all rows of G, the resulting matrix is returned; in this case, the algorithm "succeeds".

Note that the constraints that enter into choosing the j-th row are linear constraints on the entries of the row. Eq. III.1 gives j−1 constraints while Eq. (III.2) gives (j−1)(j−2)/2 constraints (the constraints need not be independent). One can express these constraints as follows: let $\vec{g}_a$ denote the a-th row vector of G. Then, let $M_j$ be a (j−1+(j−1)(j−2)/2+1)-by-n matrix, with the first j−1 rows of $M_j$ being equal to the first j−1 rows of G. The next (j−1)(j−2)/2 rows of $M_j$ are vectors $\vec{g}_a \wedge \vec{g}_b$ for a<b<j. The last row of $M_j$ is the all 1s vector, i.e., (1, 1, . . . , 1). This vector is denoted $\vec{1}$. The constraints on $\vec{g}_j$ can then be written as $$M_j \vec{g}_j = (0,0,\ldots,0,1), \quad \text{(IV.1)}$$

for $1 \leq j \leq k_T$ and $$M_j \vec{g}_j = 0 \quad \text{(IV.2)}$$

for $k_T < j \leq m$. If $\vec{1}$ is in the span of the first $j-1+(j-1)(j-2)/2$ rows of $M_j$, then the constraints have no solution; otherwise, the constraints have a solution. Let $\mathcal{M}_j$ denote the row span of $M_j$; then, for $k_T < j$, the constraint (IV.2) is equivalent to requiring that $$\vec{g}_j \in \mathcal{M}_{\frac{1}{j}}.$$

The probability that the algorithm succeeds is new analyzed, returning a matrix G. The distance of $\mathcal{G}_0^\perp$ is also analyzed. The goal is to show a lower bound on the probability that the distance is at least d, for some d. The analysis of the distance is based on the first moment method: the probability that a given vector $\vec{u}$ is in $\mathcal{G}_0^\perp$ is estimated. This probability is then summed over all choices of $\vec{u}$ such that $0 < |\vec{u}| < d$ and bound the result.

Let $\vec{u}$ be a given vector with $\vec{u} \neq 0$ and $\vec{u} \neq \vec{1}$. Let one first compute the probability that $\vec{u} \in \mathcal{G}_0^\perp$ and $\vec{u} \notin \mathcal{M}_m$ conditioned on the algorithm succeeding. Since $\vec{u} \notin \mathcal{M}_m$, then $\vec{u} \notin \mathcal{M}_j$ for all $j \leq m$. Hence, $$Pr[\vec{u} \cdot \vec{g}_j = 1 \mid \text{success and } \vec{u} \notin \mathcal{M}_j] = \frac{1}{2}, \quad \text{(IV.3)}$$

since the constraint $\vec{u} \cdot \vec{g}_j = 0$ is independent of the constraint $\vec{g}_j \in \mathcal{M}_j$. Note that success of the algorithm depends only on the choices of the odd weight rows, and the even weight rows are chosen after the odd weight rows so that the choice of $\vec{g}_j$ does not affect success. So, $$Pr[\vec{u} \in \mathcal{G}_0^\perp \text{ and } \vec{u} \notin \mathcal{M}_m \mid \text{success}] \leq \prod_{j=k_T+1}^{m} \frac{1}{2} = 2^{-k_0}. \quad \text{(IV.4)}$$

Now consider the probability that the algorithm succeeds and $\vec{u} \in \mathcal{M}_m$. As a warm-up, consider the probability that the algorithm succeeds and that some vector with small Hamming weight is in $\mathcal{G}$. Here, big-O notation is used from here on, considering the asymptotics of large n.

Lemma 1. Consider any fixed $\vec{u} \neq 0$. Then, the probability that the algorithm succeeds and that $\vec{u}$ is in $\mathcal{G}$ is bounded by:

$$Pr[\text{success and } \vec{u} \in \mathcal{G}] \leq \sum_{k=1}^{m} 2^{-n-(k-1)-(l(k-1)/2+1)}. \quad \text{(IV.5)}$$

Further, if $m = o(n)$, then $$Pr[\text{success and } \exists \vec{v} \in \mathcal{G} \text{ s.t.} |\vec{v}| \neq 0 \text{ and } (|\vec{v}| \leq n/2 - o(n) \text{ or } |\vec{v}| \geq n/2 + o(n))] = o(1). \quad \text{(IV.6)}$$

(The above equation is to be interpreted as meaning that for some function $f(n)$ which is $o(n)$ the probability that there exists a nonzero $\vec{v} \in \mathcal{G}$ with $|v\vec{v}| \leq n/2 - f(n)$ or $|\vec{v}| \geq n/2 + f(n)$ is $o(1)$).

Proof. Suppose $\vec{u}$ is in $\mathcal{G}$. Then, $\vec{u} = \sum_{i=1}^{m} b_i \vec{g}_i$. Each of the $2^m - 1$ possible nonzero choices of the vector b are considered and bound the probability that $\vec{u} = \sum_{i=1}^{m} b_i \vec{g}_i$ for the given choice. For a given choice of b, let k be the largest i such that $b_i \neq 0$. The vector $\vec{g}_k$ is chosen randomly subject to $k(k-1)/2+1$ constraints. Hence, for given $\vec{g}_1, \ldots, \vec{g}_{k-1}$ and given $b, \vec{u}$, the probability that $\vec{g}_k = \vec{u} + \sum_{i=1}^{m-1} b_i \vec{g}_i$ is bounded by $2^{-n-(k(k-1)/2+1)}$. There are $2^{k-1}$ possible choices of $b_1, \ldots, b_{k-1}$. Summing over these choices and summing over k, Eq. (IV.5) follows.

By a first moment bound, the probability that there is a nonzero vector of weight at most w in $\mathcal{G}$ is bounded by $$\left(\sum_{j=1}^{w} \binom{n}{j}\right)\left(\sum_{k=1}^{m} 2^{-n-(k-1)-(l(k-1)/2+1)}\right).$$

Similarly, the probability that there is a vector with weight at least $n-w$ in $\mathcal{G}$ is bounded by $$\left(\sum_{j=0}^{w} \binom{n}{j}\right)\left(\sum_{k=1}^{m} 2^{-n-(k-1)-(l(k-1)/2+1)}\right).$$

From this, the lemma follows.

Lemma 2. Let $m \leq \theta\sqrt{n}$ for $0 < \theta < 1/\sqrt{2}$. Let $0 < \rho < \frac{1}{2}$ be a constant. Then, the probability that the algorithm succeeds and that the distance of $\mathcal{M}_m$ is smaller $\rho n$ is $$2^{S(\rho)n - n/2 + \theta^2 n + o(n)} + o \quad (1),$$

where $S(\rho)$ is the binary entropy function $-\rho \log_2(\rho) - (1-\rho)\log_2(1-\rho)$.

Let $\rho(\theta)$ be the supremum of all $\rho$ such that the above expression tends to zero as $n \to \infty$. For all $\theta < 1/\sqrt{2}$, one has $\rho(\theta) > 0$ with $\rho(\theta) \to 0$ as $\theta \to 1/\sqrt{2}$.

Proof. One can say that G has good distance if all nonzero vectors $\vec{u}$ have $\mathcal{G}$ have $n/2 - o(n) \leq |\vec{u}| \leq n/2 + o(n)$. By lemma IV.5 the probability that the algorithm succeeds and that G does not have good distance is $o(1)$.

Let $\vec{u} \oplus 0, \vec{1}$. One can now bound the probability that the algorithm succeeds and that G has good distance and that $\vec{u} \in c\mathcal{M}_m$.

If $\vec{u} \in \mathcal{M}_m$, then for some m-by-m upper triangular matrix $A_{ij}$ and for some $c \in \{0, 1\}$, one has $$\vec{u} = \sum_{i,j \text{ s.t. } i \leq j} A_{ij} \vec{g}_i \wedge \vec{g}_j + c\vec{1}. \quad \text{(IV.7)}$$

Consider each of the $2^{m(m-1)/2} - 1$ possible nonzero choices of the matrix A and each of the two choices of c and bound the probability that Eq. (IV.7) holds for the given choice.

Suppose $c = 0$ (the case $c = 1$ follows from this case by considering the vector $\vec{u} + \vec{1}$). For a given choice of b, let k be the largest i such that $b_{ik} \neq 0$ for some $i \leq k$. Let $\vec{g}_1, \ldots,$ $\vec{g}_{k-1}$ be given; one can compute the probability that $\vec{g}_k$ is such that Eq. (IV.7) holds. Let $$\vec{v} = \vec{u} + \sum_{i,j \text{ s.t. } i \leq j < k} A_{ij} \vec{g}_i \wedge \vec{g}_j. \quad (IV.8)$$

Let $$\vec{w} = \sum_{i \text{ s.t. } i < k} A_{ik} \vec{g}_i \wedge A_{kk} \vec{1}. \quad (IV.9)$$

Then, Eq. (IV.7) implies that $$\vec{v} = \vec{w} \wedge \vec{g}_k. \quad (IV.10)$$

Assuming G has good distance, $n/2 - o(n) \leq |\vec{w}|$. Eq. (IV.10) gives then at least $n/2 - o(n)$ linear constraints on $\vec{g}_k$. The vector $\vec{g}_k$ is chosen randomly subject to $k(k-1)/2 - 1$ linear constraints. Hence, the probability that Eq. (IV.10) holds is at most $$2^{-n/2 + o(n) + k(k-1)/2}.$$

Summing over all choices of $A_{ij}$, the probability that the algorithm succeeds and that G has good distance and that $\vec{u} \in cM_m$ is bounded by $$2^{-n/2 + o(n) + m(m-1)}.$$

The number of vectors $\vec{u}$ with $|\vec{u}| \leq \rho n$ is (for $\rho \leq \frac{1}{2}$)

$$\sum_{1 \leq j \leq \rho n} \binom{n}{j} = 2^{S(\rho)n + o(n)}. \quad (IV.11)$$

Hence, by a first moment argument, the probability that the algorithm succeeds and that G has good distance and that $\mathcal{M}_m$ has distance smaller than $\rho n$ for $\rho \leq \frac{1}{2}$ is $$2^{S(\rho)n - n/2 + m(m-1) + o(n)}.$$

Finally,
Lemma 3. Let $m \leq \theta \sqrt{n}$ for $0 < \theta < 1/\sqrt{2}$. Then, the algorithm succeeds with probability $1 - o(1)$.
Proof. Suppose the algorithm fails on step k. Then, the first k-1 steps of the algorithm succeed and the vector $\vec{1}$ must be in $\mathcal{M}_{k-1} \wedge \mathcal{M}_{k-1}$. However, the probability that this happens is $o(1)$, as follows using the same proof as in lemma 2. There is one minor modifications to the proof: Eq. (IV.7) is replaced by $$\vec{1} = \sum_{i,j \text{ s.t. } i \leq j < k-1} A_{ij} \vec{g}_i \wedge \vec{g}_j. \quad (IV.12)$$

Also, there is no need to sum over vectors $\vec{u}$ as instead consideration is given to the probability that a fixed vector is in $\mathcal{M}_{k-1} \wedge \mathcal{M}_{k-1}$. Otherwise, the proof is the same.
Hence,
Theorem 1. We can choose $m = (1 - o(1)) \cdot \sqrt{n/2}$, and choose $k_0 = \lfloor c\sqrt{n} \rfloor$ or any $c < 1/\sqrt{2}$, so that $k_T = m - k_0$, and with high probability the algorithm succeeds and G has distance d at least $$\frac{2c\sqrt{n}}{\log n}$$

Proof. By lemma 2, the distance of $\mathcal{M}_m$ is $\Phi(n)$. By lemma 3, the algorithm succeeds with high probability. By Eq. IV.4 and a first moment bound, using the fact that the number of vector with weight at most $$\frac{2c\sqrt{n}}{\log n}$$

is $2^{c\sqrt{n} + o(1)}$, the theorem follows.
Now that in this regime, the distillation efficiency defined as $\gamma = \log(n/k_T)/\log(d)$ converges to 1 as $n \to \infty$.

B. Randomized Construction of Generalized Triorthogonal Matrices

The randomized construction of triorthogonal matrices above immediately generalizes to a randomized construction of generalized triorthogonal matrices. In the previous randomized construction, each vector $\vec{g}_j$ was chosen at random subject to certain linear constraints. Note that Eqs. (IV.2, IV.1) have the same left-hand side but different right-hand side. These constraints were homogeneous for row vectors in $G_0$ (see Eq. (IV.2) which has the zero vector on the right-hand side) and inhomogeneous for row vectors in $G_T$ (see Eq. (IV.1) has one nonzero entry on the right-hand side). For a generalized triorthogonal matrix, one can follow the same randomized algorithm as before except that the constraints on the vectors $\vec{g}_j$ are modified. The vectors will still be subject to linear constraints that $M_j \vec{g}_j$ is equal to some fixed vector, with $M_j$ as before. However, the fixed vector is changed in the generalized algorithm to obey the definition of a generalized triorthogonal matrix. This modifies the success probability of the algorithm, but one may verify that the algorithm continues to succeed with high probability in the regime considered before.

V. Reed-Muller Code Based Distillation

In Bryan Eastin, "Distilling one-qubit magic states into toffoli states," Physical Review A 87, 032321 (2013), 1212.4872, and Cody Jones, "Low-overhead constructions for the fault-tolerant toffoli gate," Physical. Review A 87, 022328 (2013), 1212.5069, a construction was presented to distill a single Toffoli gate from 8 T gates, so that any single error in the T gates is detected. More quantitatively, if the input T gates have error probability $\epsilon_4$, the output Toffoli has error probability $\epsilon_{out} = 28\epsilon_{in}^2 + O(\epsilon_{in}^3)$.

In this subsection, alternatives to these constructions using generalized triorthogonal codes based on Reed-Muller codes are presented. The protocols of Bryan Eastin, "Distilling one-qubit magic states into toffoli states," Physical Review A 87, 032321 (2013), 1212.4872, and Cody Jones, "Low-overhead constructions for the fault-tolerant toffoli gate," Physical Review A 87, 022328 (2013), 1212.5069, will be similar to the smallest instances.

A. Review of Classical Reed-Muller Codes

The space of $\mathbb{F}_2$-valued functions over m binary variables $x_1, \ldots, x_m$ is a vector space of dimension $2^m$, and every such function can be identified with a polynomial in $x_1, \ldots, x_m$. One can choose a bijection $\{f: \mathbb{F}_2^m \to \mathbb{F}_2\} = \mathbb{F}_2^{2^m}$ defined by $$\text{function } f: \mathbb{F}_2^m \to \mathbb{F}_2 \Leftrightarrow \text{codeword } (f(z))_{z \in \mathbb{F}_2^m} \quad (V.1)$$

where the right-hand side is the list of function values. In this bijection, the ordering of elements of $\mathbb{F}_2^m$ is implicit, but a different ordering is nothing but a different ordering of bits, and hence as a block-code it is immaterial. For example, the degree zero polynomial $f(x_1, \ldots, x_m) = 1$ is a constant function, that corresponds to all-1 vector of length $2^m$, and a degree 1 polynomial $f(x_1, \ldots, x_m) = x_1$ is a function that corresponds to a vector of length $2^m$ and weight $2^{m-1}$. Since the variables $x_i$ are binary, one has $x_i^2 = x_i$, and every polynomial function is a unique sum of monomials where each variable has exponent 0 or 1.

For an integer $r \geq 0$ the Reed-Muller code $RM(r,m) \subseteq \mathbb{F}_2^{2^m}$ is defined to be the set of all polynomials (modulo the ideal $(x_1^2 - x_1, x_2^2 - x_2, \ldots)$) of degree at most r, expressed as the lists of function values, $$RM(r,m) = \{(f(x))_{x \in \mathbb{F}_2^m} | f \in \mathbb{F}_2[x_1, \ldots, x_m]/(x_i^2 - x_i), \deg f \leq r\} \quad (V.2)$$

By definition, $RM(r,m) \subseteq RM(r+1,m)$. For example, $RM(0,m)$ is the repetition code of length $2^m$. A basis of $RM(r,m)$ comprises monomials that are products of at most r distinct variables. Hence, the number of encoded (classical) bits in $RM(r,m)$ is equal to $\Sigma_{j=0}^{r} \binom{m}{j}$. The code distance of $RM(r,m)$ is $2^{m-r}$, which can be proved by induction in m.

A property that is used herein is that whenever a polynomial does not contain $x_1 \ldots x_m$ (the product of all variables), the corresponding vector of length $2^m$ has even weight. This allows one to see that the dual of $RM(r,m)$ is again a Reed-Muller code, and direct dimension counting shows that $$RM(r,m)^\perp = RM(m-r-1,m). \quad (V.3)$$

In Reed-Muller code, it is easy to consider the wedge product of two codes, which appears naturally in the triorthogonality. Namely, given two binary subspaces V and W, one can define the wedge product as $$(v \wedge w)_i = v_i w_i \text{ where } v, w \in \mathbb{F}_2^n, \quad (V.4)$$

$$V \wedge W = \text{span}_{\mathbb{F}_2}\{v \wedge w : v \in V, w \in W\} \quad (V.5)$$

By definition, $V^{\wedge 2} \supseteq V$. Since a code word of a Reed-Muller code is a list of function values, one can see that $$RM(r,m) \wedge RM(r',m) = RM(r+r',m). \quad (V.6)$$

It follows that $RM(r,m)$ is triorthogonal subspace if $3r < m$. (In fact, it is triply even.)

Since a basis of Reed-Muller codes comprises monomials where each variable has exponent 0 or 1, it is often convenient to think of a monomial as a binary m-tuple, that specifies which variable is a factor of the monomial. For example, if m=3, the constant function $f=1$ can be represented as $(0,0,0)$, the function $f=x_1$ can be represented as $(1,0,0)$, and the function $f=x_2 x_3$ can be represented as $(0,1,1)$. This m-tuple is called an indicator vector. (In contrast to what the name suggests, the "sum" of indicator vectors is not defined.) An indicator vector a that defines a monomial corresponds to a code word $\mathbb{I}_a \in \mathbb{F}_2^{2^m}$. Under the wedge product of two code words, the corresponding two monomials is multiplied. In terms of indicator vector, this amounts to taking bit-wise OR operation which is denoted $\vee$:

$$\mathbb{I}_a \wedge \mathbb{I}_b = \mathbb{I}_{a \vee b}. \quad (V.7)$$

For example, if m=3, $$a=(1,0,1) \leftrightarrow f=x_1 x_3 \leftrightarrow \mathbb{I}_a = (00000101)$$

$$b=(1,1,0) \leftrightarrow f=x_1 x_2 \leftrightarrow \mathbb{I}_b = (00000011)$$

$$a \vee b = (1,1,1) \leftrightarrow f = x_1 x_2 x_3 \leftrightarrow \mathbb{I}_{a \vee b} = (00000001)$$

B. Triorthogonal Codes for CCZ

Let m be a multiple of 3. $RM(r=m/3-1, m)$ is considered to build a generalized triorthogonal code on $2^m$ qubits, with $k_T = k_{CS} = 0$ but $k_{CCZ} > 0$. Since $3r = m - 3 < m$, the generating matrix of $RM(m/3-1, m)$ qualifies to be $G_0$. The Z-distance of the triorthogonal code is at least the distance of $RM(m/3-1,m)^\perp = RM(2m/3,m)$, which is $2^{m/3}$. (In fact, it is exactly this.)

Triples of $G_{CCZ}$ specified triples of indicator vectors $a^{(i)}, b^{(i)}, c^{(i)}$ are chosen. The triorthogonality conditions can be summarized as follows.

$$|a^{(i)}| \leq m/3 + 1, \quad (V.8)$$

$$|b^{(i)}| \leq m/3 + 1,$$

$$|c^{(i)}| \leq m/3 + 1,$$

$$|a^{(i)} \vee b^{(j)}| \leq 2m/3,$$

$$|b^{(i)} \vee c^{(j)}| \leq 2m/3,$$

$$|c^{(i)} \vee a^{(j)}| \leq 2m/3,$$

$$|a^{(i)} \vee b^{(j)} \vee c^{(\ell)}| \begin{cases} = m & \text{if } i = j = \ell, \\ < m & \text{otherwise.} \end{cases}$$

(A similar set of conditions for $G_{CS}$ should be straightforward.) $a^{(i)}, b^{(i)}, c^{(i)}$ is chosen to have weight exactly m/3, so that the first six conditions above are automatically satisfied.

Three constructions of triples obeying these requirements are given. One construction will be analytic, one will be numerical, and one will be a randomized construction using the Lovasz local lemma. It may be useful for the reader to think of a vector $a_i \in \mathbb{F}_2^m$ as corresponding to a subset $A_i$ of some set S with $|S|=m$. Then, a triple consists of three disjoint subsets $A_i, B_i, C_i$ of cardinality m/3 each.

The analytic construction is as follows:

$$a^{(u)} = (u, \bar{u}, 0), \quad b^{(u)} = (0, u, \bar{u}), \quad c^{(u)} = (\bar{u}, 0, u) \quad (V.9)$$

where a triple is labeled by $u \in \mathbb{F}_2^{m/3} \dagger \{0, \vec{1}\}$. So, one has $2^{m/3} - 2$ triples. Here, $(u, \bar{u}, 0)$ denotes the indicator vector of length m formed by concatenating three bit strings of length m/3, and $\bar{u}$ is the complement of u so that $\bar{u}_i = 1 - u_i$. By construction, one can verify that $a^{(u)} \vee b^{(u)} \vee c^{(u)} = \vec{1}$ for any $u \in \mathbb{F}_2^{m/3}$. The case $u=0$ and $u=\vec{1}$ are excluded, for the triple to satisfy the other generalized triorthogonality conditions. Suppose that x,y,z are rows of $G_{CCZ}$ and are not all from the same triple. It is desirable to check that $|x \vee y \vee z| < m$. Any potential violation to this condition is when $x = (u_x, \bar{u}_x, 0)$ and $y = (0, u_y, \bar{u}_y)$ and $z = (\bar{u}_z, 0, u_z)$ for some $u_x, u_y, u_z$ because there is no way to have $\vec{1} = 0 \vee 0 \vee u \in \mathbb{F}_2^{m/3}$ unless u=onev, which cases have been excluded. But then, one must have that $u_x = u_y u_z$ to have $|x \vee y \vee z| = m$.

In the particular case m=3, this construction gives $k_{CCZ} = 0$. However, one can instead have $k_{CCZ} = 1$ with the triple of indicator vectors $(1,0,0), (0,1,0), (0,0,1)$, corresponding to polynomials $x_1, x_2, x_3$. The full generalized triorthogonal matrix is $$\begin{bmatrix} 0 & 0 & 0 & 0 & 1 & 1 & 1 & 1 \\ 0 & 0 & 1 & 1 & 0 & 0 & 1 & 1 \\ 0 & 1 & 0 & 1 & 0 & 1 & 0 & 1 \\ 1 & 1 & 1 & 1 & 1 & 1 & 1 & 1 \end{bmatrix} \quad (\text{V}.10)$$

where the part above the line is $G_{CCZ}$ and that below the line is $G_0$. This triorthogonal matrix is maximal in the sense that $(G^{\wedge 2})^\perp = G_0$. The resulting distillation routine has error probability $28p^2 + O(p^3)$ if input T-states have error probability $p$.

For $m=6$, one finds $n=64$, $k_{CCZ}=2$ and distance 4, of which the triples in terms of polynomials are $\{x_1x_2, x_3x_4, x_5x_6\}$ and $\{x_2x_3, x_4x_5, x_6x_1.\}$. The $m=6$ instance was investigated further to see if there could be more logical cubits extending the two triples, but it was found that there does not exist any extra solution to the generalized triorthogonality equations. Instead, $G_0$ were able to be extended. The resulting generalized triorthogonal matrix, denoting each row by a polynomial, is $$\begin{bmatrix} x_1x_2 \\ x_3x_4 \\ x_5x_6 \\ x_2x_3 \\ x_4x_5 \\ x_6x_1 \\ 1 \\ x_1 \\ x_2 \\ x_3 \\ x_4 \\ x_5 \\ x_6 \\ x_1x_3x_5 + x_3x_5 \\ x_1x_3x_5 \\ x_1x_3 + x_1x_5 \\ x_1x_3 + x_1x_3x_5 \end{bmatrix} \quad (\text{V}.11)$$

This triorthogonal matrix is also maximal in the sense that $(G^{\wedge 2})^\perp = G_0$. The leading term in the output error probability is $2944p^4$. The coefficient was obtained by brute-force weight enumeration and MacWilliams identity.

These two instances of generalized triorthogonal codes give T-to-CCZ protocols similar to those of Bryan Eastin, "Distilling one-qubit magic states into toffoli states," Physical Review A 87, 032321 (2013). 1212.4872, and Cody Jones, "Low-overhead constructions for the fault-tolerant toffoli gate," Physical Review A 87, 022328 (2013), 1212.5069, but not identical; the 64T-to-2CCZ protocol here has a different coefficient in the output error probability.

For $m=9$, $n=512$, $k_{CCZ}=6$ and distance 8 was found. A numerical search was then performed to see if it would be possible to have a larger $k_{CCZ}$, restricting to the case that triples of $G_{CCZ}$ are associated with triples of indicator vectors of weight $m/3$. $k_{CCZ}=10$ was also found, and $G_0$ further extended to make the resulting triorthogonal matrix maximal in the sense that $(G^{\wedge 2})^\perp = G_0$.

$$G_{CCZ} = \begin{bmatrix} x_4x_5x_7, & x_2x_6x_8, & x_1x_3x_9 \\ x_4x_5x_9, & x_2x_7x_8, & x_1x_3x_6 \\ x_3x_4x_6, & x_1x_5x_8, & x_2x_7x_9 \\ x_1x_8x_9, & x_3x_4x_7, & x_2x_5x_6 \\ x_2x_5x_9, & x_1x_3x_4, & x_6x_7x_8 \\ x_1x_4x_5, & x_2x_3x_8, & x_6x_7x_9 \\ x_3x_5x_6, & x_1x_2x_7, & x_4x_8x_9 \\ x_1x_3x_8, & x_2x_4x_9, & x_5x_6x_7 \\ x_2x_3x_5, & x_1x_7x_9, & x_4x_6x_8 \\ x_3x_8x_9, & x_1x_5x_7, & x_2x_4x_6 \end{bmatrix} \quad (\text{V}.12)$$

$$G_0 = \begin{bmatrix} RM(r=2, m=9) \\ x_1x_2x_9 \\ x_1x_2x_8 \\ x_6x_8x_9 \\ x_3x_7x_8 \end{bmatrix} \quad (\text{V}.13)$$

Here, each line in $G_{CCZ}$ contains a triple of polynomials (actually monomials). The algorithm used was as follows. A version of the algorithm in the constructive proof of the Lovasz local lemma of Robin A Moser and Gabor Tardos, "A constructive proof of the general loviasz local lemma," Journal of the ACM (JACM) 57, 11 (2010) was used. A subroutine to "initialize a triple" was defined, which, for given i, sets $a^{(i)}$, $b^{(i)}$, $c^{(i)}$ to be random indicator vectors of weight $m/3$ each, subject to the constraint that $a^{(i)} \vee b^{(i)} \vee c^{(i)} = \vec{1}$ (this is accomplished by choosing $a^{(i)}$ at random of weight $m/3$, choosing $b^{(i)}$ random of weight $m/3$ with its 1 entries only in the 0 entries of $a^{(i)}$, and then $c^{(i)}$ is fixed). Then the following can be performed:

1. Pick $k_{CCZ}$ and initialize $k_{CCZ}$ different triples.
2. Check the triorthogonality conditions
3. If a violation of the conditions exists, initialize all triples in the first violation that is found, and go to 2. (If vectors x,y,z are not all in the same triple and $x \vee y \vee z = \vec{1}$, then the triples containing x,y,z are found (there are either two or three such triples) and those triples initialized.) If no violation exists, exit the algorithm, reporting success.

This algorithm was run until it reports success or until the algorithm is terminated or otherwise halted. A slight modification of the algorithm was also investigated, in which some random permutation of the triples was performed at various steps (this has an effect similar to randomizing the order in winch the conditions are checked).

C. Lovasz Local Lemma

The numerics above used an algorithm used in the constructive proof of the Lovasz local lemma. However, the algorithm was attempted to be run in a regime in which the local lemma does not guarantee a solution. However, it is interesting that the local lemma does imply something about the possible scaling of $k_{CCZ}$ for large m.

Suppose that there are $n_{triple}$ triples. Imagine choosing each triple at random, following the initialization routine of the above algorithm. Label the triples by an integer ranging $1, \ldots, n_{triple}$. Define a bad event $E_{i,j,k}$ to be the event that for three triples, labelled i,j,k, with $1 \leq i < j < K \leq n_{triple}$, there is a violation of the triorthogonality conditions involving one indicator vector from each triple. Such events $E_{i,j,k}$ are termed "three triple events". Define a bad event $E_{i,j}$ to be the event that for two triples, labelled i,j, with $1 \leq i < j \leq n_{triple}$, there is a violation of the triorthogonality conditions involving one indicator vector from one triple and two indicator vectors from the other triple. Such an event $E_{i,j}$ is termed "two triple events".

The probability of $E_{i,j,k}$ can be estimated as follows: there are $3^3=27$ different choices of indicator vectors if one chooses one indicator vector from each triple. The vector from the first triple is random. The probability that the vector from the second triple has no overlap with the vector from the first triple is $$\frac{\binom{\frac{2}{3}m}{\frac{1}{3}m}}{\binom{m}{\frac{1}{3}m}}.$$

Conditioned on the vectors from the first two triples having no overlap, the probability that the vector from the third triple has no overlap with either of the other two vectors is $$\frac{1}{\binom{m}{\frac{1}{3}m}}.$$

Thus, $$Pr(E_{i,j,k}) \leq 27 \frac{\binom{\frac{2}{3}m}{\frac{1}{3}m}}{\binom{m}{\frac{1}{3}m}\binom{m}{\frac{1}{3}m}} \sim 2^{-m(2H(1/3)-2/3)}, \quad (V.14)$$

where $H(p)=-p \log_2(p)-(1-p)\log_2(1-p)$ is the binary entropy function and the approximate equality is up to subexponential factors. Note $H(\frac{1}{3}) \approx 0.918$ and $2H(\frac{1}{3}) - \frac{2}{3} \approx 1.17$.

The probability of $E_{i,j}$ can be estimated as follows: there are 36 ways to choose one indicator vector from i and two from j or two from i and one from j. Suppose one chooses two from i; they have no overlap by construction and the probability that the vector from j has no overlap with them is $$\frac{1}{\binom{m}{\frac{1}{3}m}}.$$

Thus, $$E_{i,j} \leq 36 \frac{1}{\binom{m}{\frac{1}{3}m}} \sim 2^{-mH(1/3)}. \quad (V.15)$$

The following statement of the Lovasz local lemma (see Noga Alon and Joel H Spencer, "The probabilistic method" (John Wiley and Sons, 2004)) is used. Define a dependency graph so that two events are adjacent if they are dependent. For event A, let $\Gamma(A)$ denote the set of neighbors of A in the dependency graph. Then, if one can choose a number $x(A)$ for each event A, $0 \leq x(A) < 1$, such that for all A one has $$Pr(A) \leq x(A) \prod_{B \in \Gamma(A)} (1 - x(B)), \quad (V.16)$$

then there is a nonzero probability that no event occurs.

The neighborhood of any event (either three triple or two triple) includes $O(n_{triple}^2)$ three triple events and $O(n_{triple})$ two triple events. Let one simply choose $x(A)=2Pr(A)$ for all A. Then, to show Eq. (V.16), it suffices to show that $\Pi_{B \in \Gamma(A)}(1-x(B)) \geq \frac{1}{2}$. So, it suffices to show that $\Sigma_{B \in \Gamma(A)} Pr(B) \leq \frac{1}{4}$. So, $n_{triple}^2 2^{-m(2H(1/3)-2/3)} + n_{triple} 2^{-mH(1/3)} = O(1)$. Thus, $$n_{triple} \lesssim 2^{-m(H(1/3)-1/3)}$$

$$\lesssim 2^{0.58 \cdots m}. \quad (V.17)$$

D. Error Probabilities and Quantitative Values

The generalized triorthogonal matrix has distance $d=2^{m/3}$. The number of error patterns of weight d which do not violate any stabilizer of the code is equal to the number of code words of RM(2m/3,m) with weight d. This is known to equal $$A_d = \frac{2^m(2^m-2^0)(2^m-2^1)(2^m-2^2) \cdots (2^m-2^{\mu-1})}{2^\mu(2^\mu-2^0)(2^\mu-2^1)(2^\mu-2^2) \cdots (2^\mu-2^{\mu-1})}, \quad (V.18)$$

where $\mu=m-r$ with in this case $r=2m/3$ so $\mu=m/3$. For m=3, $A_d=28$. For m=6, $A_d=10416$. For m=9, $A_d=50434240 \approx 5 \times 10^7$. The leading coefficient in the output error rate is of course at most these numbers, since there could be Z-stabilizers of weight d. Further, in the m=6 and m=9 cases above, $G_0$ were extended so the number of error patterns of weight d is strictly smaller than $A_d$. Indeed, for the maximal m=6 code, a direct enumeration shows that there are 3248 error patterns that does not violate X-Stabilizers, out of which 304 are Z-stabilizers.

Is it also known that all weights of RM(2m/3,m) between d and 2d are of the form $2d-2^i$ for some i, so that the next weight after d is equal to 3d/2.

To give some numbers when using these codes in a distillation protocol, consider the m=9 case with $k_{CCZ}=10$. Suppose one has an input error probability $\epsilon_{in}=10^-$. Then, the probability that the protocol succeeds (that no stabilizer errors are detected) is lower bounded by $(1-\epsilon_{in})^{512} \approx 0.599$. The average number of output CCZ magic states is then $\overline{n_{CCZ}} \approx 5.99$. One expects that for m=9 the contribution of errors with weight 3d/2=12 will be negligible compared to the leading contribution. Thus, one can approximate that the output error probability by $\epsilon_{out} \approx A_d \epsilon_{in}^8 (1-\epsilon_{in})^{504} \approx 3.0 \times 10^{-17}$, where the factor $(1-\epsilon_{in})^{504}$ represents the requirement that none of the other input T gates have an error. One expects that this is an overestimate because, as mentioned above, not all error patterns of weight d that do not violate a stabilizer will lead to a logical error and also additional stabilizers to $G_0$ were added. Thus, the ratio $\overline{\epsilon^{out}} = \epsilon_{out}/\overline{n_{CCZ}} \approx 5.1 \times 10^{-18}$. $512/\overline{n_{CCZ}} \approx 85.5$ T-gates per output CCZ magic state was used.

It requires 4 high-quality T-gates to produce a single high-quality CCZ state (see Guang Song and Andreas Klappenecker, "Optimal realizations of simplified toffoli gates," Quantum Information and Computation 4, 361372 (2004), and Cody Jones, "Low-overhead constructions for the fault-tolerant toffoli gate," Physical Review A 87, 022328 (2013), 1212.5069), so this protocol's efficiency is comparable (if the goal is to produce CCZ states) to a protocol that uses only 85.5/4≈21.4 input T-gates per output T-gate (and, since one uses 4 T-gates to make a CCZ state, the quality of those output T-gates must be four times better than the needed CCZ quality).

If one is able to improve the input error rate then the protocol becomes more efficient as the success probability becomes higher, asymptoting at 51.2 T-gates per output CCZ magic state, comparable to a protocol using 12.8 input T-gates to produce an output T-gate. Alternatively, one can also make the protocol more efficient by applying error correction as follows. Choose some integer m≥0. Then, modify the protocol; as usual, one encodes logical qubits in the |+⟩ state into the error correcting code, applies a transversal T-gate, and then measures the stabilizers. However, while usually one would declare failure if any stabilizer errors occur, one can instead apply error correction: if the error syndrome can be caused by at most m errors, then one corrects those errors by applying Pauli Z operators to the appropriate physical qubits. For example, at $\epsilon_{in}=10^{-3}$, the probability that there are 0 or 1 input errors is equal to $(1-\epsilon_{in})^{512}+512\epsilon_{in}(1-\epsilon^{in})^{511}\approx 0.906$, giving the acceptance probability for m=1. Applying this error correction does reduce the quality of the output states: with m=1, now seven input errors can cause a logical error. The number of such weight seven input error patterns that cause a logical error is at most $8A_d$, so that the output error per output logical qubit is approximately $8A_d\epsilon_{in}^7/10\approx 5\times 10^{-14}$.

E. Punctured Reed-Muller Codes

Motivated by the puncturing ideas of III B, puncturing a Reed-Muller code was considered. Instead of using RM(m/3−1,m) as before, now consider RM(m,3m+1). This code is triorthogonal as before, and is maximal in the sense that $(G^{\wedge 2})^\perp = G_0$. This code was then randomly punctured. The codes found numerically are listed in Tables I,II. Observe that the coefficients $A_d$ in the output error probabilities are fairly small given the code lengths.

It was found that there is a unique d=5 code that can be obtained by puncturing RM(2,7); it is [[125, 3, 5]]. This can be checked as follows: Any three-puncture in RM(r,m>1) is equivalent (e.g., a punctured code from a Reed-Muller code is determined by the isomorphism class under affine transformations of the set of points corresponding to the punctured coordinates in the m-dimensional unit hypercube, since an affine transformation corresponds to an automorphism of Reed-Muller codes. Any three-point set in the unit hypercube is affinely independent.) and one can numerically verify that any four-puncture to RM(2,7) gives d=4.

The numerical techniques can now be explained.

The number k of logical qubits in each case in the tables was calculated after the puncture; k is equal to the number of punctures only if the submatrix of the generating matrix of RM on the punctured coordinates is full rank. The Z-distance, which is relevant to the distillation purposes, is computed either by the MacWilliams identity applied to X-stabilizer weight enumerators that are computed by brute force enumeration or by enumerating all Z-logical operators of a given weight. The computed Z-distance is in fact the true code distance since the Z-stabilizer group contains a subgroup associated with the bit strings of the X-stabilizer group. The MacWilliams identity was an effective method especially when the base code was RM(2,7) where there are only 29 X-stabilizers prior to puncture. For this base code, a random search was performed, trying many different random punctures of the code, and good examples that were found selected.

When the base code was RM(3,10), there are 176 X-stabilizers to begin with, so the brute force enumeration of the X-stabilizer weight enumerator became prohibitive unless many coordinates were punctured. Also, at larger distances (≥5), a guided search became more efficient than a random search among codes. To solve both these problems, an "unpuncturing" strategy was used based, on the following observation. Let $G_0$ be a matrix whose rows represent X-stabilizers, and suppose G' is a matrix whose rows represent X-logical operators such that any Z-logical operator of minimal weight d anticommutes with at least one X-logical operator of G'. Then, consider a new X-stabilizer matrix $$\begin{pmatrix} I & G' \\ 0 & G_0 \end{pmatrix}.$$

This new code does not have any Z-logical operator of weight≤d. The proof is as follows: If the bit string v of a Z-logical operator of weight≤d have nonzero substring on the columns of $G_0$, then, by construction, that substring must have weight at least d, but such a substring has odd overlap with some row of G' which must be cancelled by the substring on the columns of I. This forces the weight to be larger than d. The construction of a new code by adding more stabilizers and qubits, is precisely the inverse of the puncturing procedure (up to permutations of qubits), hence the name "unpuncturing."

For small distances, e.g., d=3, it is easy to enumerate all Z-logical operators of weight d. One can then select X-logical operators to "catch" those minimal weight Z-logical operators, and

TABLE I

Punctured Reed-Muller codes I. In this table, the base code prior to puncturing is RM(2, 7) = [128, 29, 32]. The decimal integers are short-hand notation for the binary coordinate that indexes bits in the Reed-Muller code; e.g., "3" in the first example means that one has to puncture the bit labelled by 0000011 ∈ $F_2^7$. The number of Z-logical operators of weight d is obtained by the MacWilliams identity applied to the X-stabilizer weight enumerators. Since the Z stabilizer group in any case corresponds to a subspace of dual of the pre-puncture Reed-Muller code, the minimal weight of any Z stabilizer is at least 8. Every X-stabilizer has weight a multiple of 8, and every X-logical operator has weight 7 mod 8. Hence, the transversal T becomes T† on every logical qubit. As a distillation protocol, the output error probability is $A_d p^d$ at the leading order where p is the independent error probability of the input T states.
Code parameter [[n, k, d]] and $A_d$ = # (Z-logical operators of weight d)
Decimal representation of binary coordinates to puncture

[[114, 14, 3]], $A_3$ = 30, n/k = 8.14
3, 10, 19, 20, 64, 66, 72, 96, 99, 104, 110, 114, 115, 124
[[112, 16, 3]], $A_3$ = 96, n/k = 7
6, 8, 13, 14, 17, 28, 29, 33, 44, 57, 65, 75, 79, 82, 106, 116
[[109, 19, 3]], $A_3$ = 324, n/k = 5.73
10, 15, 16, 17, 32, 39, 40, 41, 48, 59, 66, 69, 72, 81, 100, 102, 108, 120, 126
[[118, 10, 4]], $A_4$ = 210, n/k = 11.8
11, 17, 19, 59, 74, 76, 91, 99, 105, 110
[[116, 12, 4]], $A_4$ = 495, n/k = 9.6
0, 31, 52, 61, 73, 94, 96, 112, 114, 115, 118, 120 identify the punctured coordinates that gave rise to the chosen X-Logical operators. One X-logical operator $\bar{X}$ was chosen each time so that the number of the minimal weight Z-logical operators that $\bar{X}$ anticommutes with is maximized. The codes in Table II were found by this unpuncturing.

A random puncturing was started giving a d=3 code and then successively unpunctured to obtain distance 4, 5 codes. The d=6 and d=7 codes in Table II were obtained by unpuncturing the best rate code with d=5. Note that for the code [[937, 87, 7]], it was prohibitively costly to enumerate all logical operators of weight 7, so an upper bound on the number of Z-logical operators was used. The bound was possible since the X-stabilizer's weight enumerator of [[887, 137, 5]] was computed by brute force, unpuncturing which yielded [[937, 87, 7]]; while in general this X-stabilizer weight enumerator is very costly to compute as explained above, it was possible to compute it for a single code example (it would not be practical to compute this enumerator for all the codes tried in a random search).

be even numbers. For hyperbolic codes, the binary vector space corresponding to the logical operators is isomorphic to direct sum of hyperbolic planes. Here, only hyperbolic codes are considered. Choose a basis to $\{\ell^{(1)}, \ell^{(2)}, \ldots, \ell^{(k_{inner})}\}$ of $\mathcal{S}^\perp/\mathcal{S}$ such that the dot product between the basis vectors satisfy $$\ell^{(2a-1)} \cdot \ell^{(2b-1)} = 0$$

$$\ell^{(2a)} \cdot \ell^{(2b)} = 0$$

for $a, b = 1, \ldots, k_{inner}/2$ $$\ell^{(2a-1)} \cdot \ell^{(2b)} = \begin{cases} 1 & \text{if } a = b, \\ 0 & \text{otherwise.} \end{cases}$$

We call such a basis hyperbolic, and Gram-Schmidt procedure can be used to find a hyperbolic basis. Logical operators can be defined as

TABLE II

Punctured Reed-Muller Codes II, continued from Table I. In this table, the base code prior to puncturing is RM(3, 10) = [1024, 176, 128]. The bound on $A_7$ of [[937, 87, 7]] is from the exact weight enumerator (not shown) of [[887, 137, 5]]; the true value of $A_7$ is believed to be much smaller based on the previous examples.

[[863, 161, 3]], $A_3$ = 3231, n/k = 5.36
3, 4, 7, 10, 15, 39, 42, 44, 45, 49, 59, 66, 68, 70, 72, 74, 91, 103, 104, 109, 119, 120, 122, 123, 130, 161, 164, 170, 183, 186, 200, 208, 214, 233, 236, 237, 248, 270, 278, 288, 294, 295, 296, 304, 307, 321, 323, 338, 341, 347, 353, 356, 359, 360, 365, 374, 377, 404, 411, 414, 425, 443, 447, 455, 465, 470, 474, 477, 480, 482, 492, 493, 502, 507, 509, 511, 513, 517, 525, 528, 539, 543, 550, 555, 567, 577, 581, 598, 599, 600, 602, 603, 608, 609, 612, 616, 620, 621, 628, 638, 646, 652, 659, 660, 669, 678, 681, 687, 714, 728, 738, 739, 741, 743, 744, 745, 748, 750, 758, 768, 786, 791, 794, 795, 806, 822, 843, 844, 845, 853, 855, 864, 865, 884, 889, 891, 892, 902, 907, 913, 916, 921, 939, 942, 943, 944, 945, 951, 953, 961, 965, 971, 978, 980, 984, 985, 992, 1002, 1005, 1012, 1018
[[872, 152, 4]], $A_4$ = 1514, n/k = 5.74
31, 35, 45, 46, 50, 62, 85, 89, 91, 113, 118, 119, 122, 127, 140, 144, 157, 168, 169, 171, 173, 186, 190, 210, 218, 219, 228, 230, 237, 244, 249, 254, 263, 271, 281, 282, 308, 336, 352, 353, 398, 404, 405, 411, 412, 441, 444, 455, 456, 460, 471, 474, 475, 480, 484, 488, 492, 502, 504, 507, 511, 517, 520, 522, 532, 542, 543, 559, 570, 574, 577, 578, 579, 580, 583, 592, 598, 601, 602, 605, 608, 612, 615, 618, 620, 637, 643, 644, 653, 658, 667, 688, 690, 694, 714, 717, 724, 727, 737, 745, 752, 754, 758, 764, 765, 770, 782, 794, 795, 802, 808, 812, 813, 814, 815, 823, 824, 838, 847, 849, 850, 852, 861, 863, 867, 871, 874, 880, 901, 907, 911, 915, 919, 921, 924, 926, 941, 950, 954, 969, 971, 972, 976, 977, 982, 991, 995, 999, 1008, 1013, 1014, 1023
[[887, 137, 5]], $A_5$ = 709, n/k = 6.47
11, 21, 30, 37, 39, 53, 68, 74, 78, 82, 98, 105, 107, 120, 130, 136, 148, 149, 152, 161, 162, 163, 181, 194, 209, 210, 211, 233, 234, 243, 244, 267, 269, 274, 277, 281, 284, 298, 317, 324, 325, 329, 341, 361, 362, 375, 389, 399, 400, 405, 412, 415, 423, 425, 449, 480, 487, 495, 507, 511, 522, 538, 542, 557, 563, 578, 579, 584, 593, 600, 609, 610, 619, 622, 623, 635, 638, 639, 640, 643, 644, 651, 653, 655, 657, 661, 671, 672, 678, 680, 692, 714, 727, 737, 775, 777, 792, 796, 806, 817, 826, 827, 831, 833, 834, 837, 851, 852, 854, 857, 866, 868, 871, 875, 880, 890, 891, 896, 897, 898, 916, 924, 936, 938, 941, 958, 964, 965, 966, 973, 975, 983, 984, 990, 996, 997, 1022
[[912, 112, 6]], $A_6$ = 1191, n/k = 8.14
11, 21, 37, 39, 68, 74, 78, 82, 98, 107, 130, 148, 152, 161, 162, 163, 181, 194, 209, 210, 211, 233, 243, 244, 267, 269, 274, 277, 298, 317, 324, 325, 329, 341, 361, 362, 399, 405, 412, 415, 423, 425, 480, 487, 495, 507, 522, 542, 557, 563, 579, 584, 593, 600, 609, 610, 619, 622, 623, 635, 639, 640, 653, 655, 657, 661, 671, 672, 678, 680, 692, 714, 727, 737, 775, 777, 792, 796, 806, 826, 827, 831, 833, 834, 837, 851, 852, 854, 857, 866, 871, 875, 880, 890, 891, 896, 897, 898, 916, 924, 936, 938, 941, 958, 965, 966, 983, 984, 990, 996, 997, 1022
[[937, 87, 7]], $A_7 \leq$ 1887905, n/k = 10.77
21, 37, 39, 68, 74, 82, 98, 130, 148, 152, 162, 163, 194, 209, 210, 211, 233, 244, 267, 269, 274, 317, 324, 325, 329, 341, 361, 362, 399, 405, 412, 415, 423, 480, 487, 495, 507, 522, 542, 557, 563, 584, 593, 600, 609, 610, 623, 635, 639, 640, 657, 661, 671, 672, 692, 714, 727, 737, 777, 792, 796, 826, 827, 831, 833, 834, 837, 851, 852, 854, 857, 871, 875, 880, 890, 891, 896, 897, 898, 924, 936, 958, 966, 984, 996, 997, 1022

VI. T-to-CCZ Protocols Using Hyperbolic Weakly Self-Dual CSS Codes

In Jeongwan Haah, Matthew B. Hastings, D. Poulin, D. Wecker, "Magic state distillation with low space overhead and optimal asymptotic input count," 1703.07847v1 weakly self-dual CSS codes on $n_{inner}$ qubits were classified into two types. If $\mathcal{S}$ is the self-orthogonal subspace of $\mathbb{F}_2^n$ corresponding to the stabilizers of the code, the distinction criterion is whether $\mathcal{S}$ contains all-1 vector $\vec{1}$. If $\vec{1} \in \mathcal{S}$, the space of representing logical operators $\mathcal{S}^\perp/\mathcal{S}$ is hyperbolic, and the parameters $n_{inner}$, $k_{inner}$, and the code distance must $$\tilde{X}_{2a-1} = X(\ell^{(2a-1)}), \tilde{Z}_{2a-1} = Z(\ell^{(2a)}),$$

$$\tilde{X}_{2a} = X(\ell^{(2a)}), \tilde{Z}_{2a} = Z(\ell^{(2a-1)}), \text{ for } a = 1, \ldots, k_{inner}/2. \quad (VI.1)$$

Note that this is different from the magic basis of Jeongwan Haah, Matthew B. Hastings, D. Poulin, and D. Wecker, "Magic state distillation with low space overhead and optimal asymptotic input count," 1703.07847v1, where a pair of logical qubits are swapped under the transversal Hadamard.

Next, the action of transversal S gate is investigated. Since $SXS^\dagger = Y = -iZX$, unless $n_{inner}$ is a multiple of 4, the transversal S is not logical. However, there is a simple way to get around this. Instead of applying S on every qubit, exponents $t_i = \pm 1$ can be assigned to each qubit i, which depends on the code, and one can apply $\otimes_i S^{t_i}$. $t_i$ can be chosen such that $$\sum_i v_i t_i = 0 \bmod 4 \text{ for any } v \in \{b^{(1)}, \ldots, b^{(\dim S)}\} \subset \mathcal{S}, \quad \text{(VI.2)}$$

$$\sum_i \ell_i^{(a)} t_i = 0 \bmod 4 \text{ for any } a = 1, \ldots, k_{inner}, \quad \text{(VI.3)}$$

where it is implicit that the elements of $\mathbb{F}_2$ are promoted to usual integers by the rule that $\mathbb{F}_2 \ni 0 \mapsto 0 \in \mathbb{Z}$ and $\mathbb{F}_2 \ni 1 \mapsto 1 \in \mathbb{Z}$, and $\{b^{(j)}\}$ is a basis of the $\mathbb{F}_2$-vector space $\mathcal{S}$.

A solution $t_i$ to these conditions always exists, because the Gauss elimination for the system of equations over $\mathbb{Z}/4\mathbb{Z}$ never encounters division by an even number when applied to a full $\mathbb{F}_2$-rank matrix. Once a valid $t_i$ is obtained, then it follows that $\Sigma_i v_i t_i = 0 \bmod 4$ for any vector $v \in \mathcal{S}$. Since any vector is a sum of basis vectors, which are orthogonal with one another, this follows from the following identity. For any integer vector y (see, e.g., Harold N. Ward, "Weight polarization and divisibility," Discrete Mathematics 83, 315326 (1990), and Sergey Bravyi and Jeongwan Haah, "Magic-state distillation with low overhead," Physical Review A 86, 052329 (2012)), $$\sum_i y_i \bmod 2 = \sum_i y_i - 2 \sum_{i<j} y_i y_j \bmod 4, \quad \text{(VI.4)}$$

$$\sum_i y_i \bmod 2 = \sum_i y_i - 2 \sum_{i<j} y_i y_j + 4 \sum_{i<j<k} y_i y_j y_k \bmod 8. \quad \text{(VI.5)}$$

Likewise, for any vector $\ell \in \mathcal{S}^\perp$ and any $s \in \mathcal{S}$, $\Sigma_i \ell_i t_i = \Sigma_i (\ell + s \bmod 2)_i t_i \bmod 4$.

It will now be shown that the action of $\otimes_i S^{t_i}$ on the logical state $|\tilde{x}_1, \ldots, \tilde{x}_{k_{inner}}\rangle$ is control-Z on hyperbolic pairs of logical qubits:

$$\left(\bigotimes_i S^{t_i}\right) |\tilde{x}_1, \ldots, \tilde{x}_{k_{inner}}\rangle = \frac{1}{\sqrt{|S|}} \quad \text{(VI.6)}$$

$$\sum_{s \in \mathcal{S}} e^{(i\pi/2) \sum_j f_j t_j} | f = s + x_1 \ell^{(1)} + \ldots + x_{k_{inner}} \ell^{(k_{inner})} \bmod 2 \rangle =$$

$$e^{(i\pi/2) \sum_j f_j t_j} | f = x_1 \ell^{(1)} + \ldots + x_{k_{inner}} \ell^{(k_{inner})} \bmod 2 \rangle =$$

$$e^{(i\pi/2)\left(\sum_{j,a} \ell_j^{(a)} t_j - 2 \sum_{a<b} \ell_j^{(a)} \ell_j^{(b)} t_j\right)}$$

$$|x_1 \ell^{(1)} + \ldots + x_{k_{inner}} \ell^{(k_{inner})} \bmod 2 \rangle =$$

$$\left(\prod_{j=1}^{k_{inner}/2} \overline{CZ}_{2j-1,2j}\right) |\tilde{x}_1, \ldots, \tilde{x}_k\rangle$$

where in the third line (VI.4) was used and in the last line (VI.1) was used.

Therefore, if a control-S gate is used over a hyperbolic code, then a measurement routine was implemented for product of CZ operators. The control-S can be implemented using an identity $$^C S = ({}^C e^{i\pi/4}) T({}^C X) T^\dagger({}^C X). \quad \text{(VI.7)}$$

Since a hyperbolic CSS code contains $\vec{1}$ in the stabilizer group, one knows $\Sigma_i t_i \vec{1}_i = 0 \bmod 4$, and the control-phase factor will either cancel out or become Z on the control. If T gates in this measurement routine are noisy with independent Z errors of probability p, then upon no violation of stabilizers of the hyperbolic code, the measurement routine puts $O(p^2)$ error into the measurement ancilla, and $O(p^d)$ error into the state under the measurement where d is the code distance of the hyperbolic code.

A. Quadratic Error Reduction

The control-Z action on the logical level can be used to implement control-control-Z, whenever the hyperbolic code is encoding one pair of logical qubits. The smallest hyperbolic code that encodes one pair of logical qubits is the 4-qubit code of code distance 2, with stabilizers XXXX and ZZZZ. The choice of logical operators that conforms with the present hyperbolic conditions is $$\begin{pmatrix} X & X & I & I \\ I & Z & Z & I \\ I & X & X & I \\ Z & Z & I & I \end{pmatrix}. \quad \text{(VI.8)}$$

The exponents $t_i$ for S is thus $$t = (+-+-). \quad \text{(VI.9)}$$

Using this choice of $t_i$, the phase factor in (VI.7) cancels out.

Every non-Clifford gates enters the circuit by (VI.7), and hence any single error will be detected. Since the ancilla that controls S inside the hyperbolic code can be contaminated by a pair of T gates acting on the same qubit, there is little reason to consider hyperbolic code of code distance higher than 2, When applied to $|+^{\otimes 3}\rangle$, the routine described here outputs one CCZ state using 8 T-gates with output error probability $28p^2 + O(p^3)$ where p is the independent error rate of T gates.

The overall circuit has a few similarities to the quadratic protocol in Cody Jones, "Composite toffoli gate with two-round error detection," Physical Review A 87, 052334 (2013), 1303.6971, in which the same choice of logical operators are used, but control-$(TXT^\dagger)^{\otimes 4}$ is applied on the code, followed by syndrome measurement and then $\pi/2$ rotation along x-axis on the Bloch sphere. In contrast, control-$(TXT^\dagger X)_1 (XTXT^\dagger)_2 (TXT^{554} X)_3 (XTXT^\dagger)_4$, and then syndrome measurement, without any further Clifford correction.

B. Quartic Error Reduction

For a higher order error suppression of CCZ states, the hyperbolic codes can be used to check the eigenvalue of the stabilizers of the CCZ state $|CCZ\rangle = CCZ|+^{\otimes 3}\rangle$. The stabilizers are $(CZ)_{12} X_3$, $(CZ)_{13} X_2$, and $(CZ)_{23} X_1$. (These are obtained by conjugating $X_{1,2,3}$, the stabilizers of $|+^{\otimes 3}\rangle$, of CCZ gate.) As there are three stabilizers, one can use three rounds of checks. By symmetry, it suffices to explain how to measure $(CZ)_{12} X_3$.

Suppose one has a hyperbolic weakly self-dual CSS code of parameters $[[n_{inner}, 2k, 4]]$. This is an inner code (see, e.g., Jeongwan Haah, Matthew B. Hastings, D. Poulin, and D. Wecker, "Magic state distillation with low space overhead and optimal asymptotic input count," 1703.07847v1). For example, there is a quantum Reed-Muller code of parameters $[[2^m, 2^m - 2m - 2, 4]]$ for any $m \geq 4$. There are also Majorana codes which can be interpreted as hyperbolic codes on qubits. See, e.g., Sergey Bravyi, Bernhard Leemhuis, and Barbara M. Terhal, "Majorana fermion codes," New J. Phys. 12, 083039 (2010), 1004.3791; M. B. Hastings, "Small majorana fermion codes," 1703.00612; S Vijay and L. Fu, "Quantum error correction for complex and majorana fermion qubits," 1703.00459 Take k independent output CCZ states from the quadratic protocol in the previous subsection, and separate a single qubit from each of the CCZ states. On these separated qubits, $^{C}X$ is acted on with a common control. The rest 2k qubits are then embedded into the hyperbolic code, with which $^{C}(CZ)$ will applied on the logical qubits, using 2n T gates with independent error probability p. It is desirable that the control qubit is common for all controlled gates. This way, the product of k stabilizers on the k CCZ states are measured.

One can run this check routine three times for each of the three stabilizers of CCZ states. In total, the number of input T gates is 8k−6n where 8k is from the protocol in the previous subsection, and 3·2n is inside the distance-4 hyperbolic inner code.

Upon no stabilizer violations of the inner code and outer code measurements, the protocol outputs k CCZ-states. If the inner hyperbolic code does not have any error on T gates while implementing $^{C}(CZ)$, then the output CCZ states' error rate is quadratic in the input CCZ states' error rate. This being quadratic is due to the fact that an outer code of code distance 2 is used. (An outer code is one that specifies which input states to check. See Jeongwan Haah, Matthew B. Hastings, D. Poulin, and D. Wecker, "Magic state distillation with low space overhead and optimal asymptotic input count," 1703.07847v1, for detail.) Thus, the output error from this contribution is $$\binom{k}{2}$$

$(28p^2)^2$ at the leading order.

There could be a pair of errors in the T gate inside the inner code that flips the eigenvalue measurement of (CZ)X. In order for this type of error to be output error there must be an odd number of errors in the input CCZ states. Hence, the contribution to the output error probability is $k \cdot 28p^2 \cdot 3np^2$ at leading order.

Finally, the inner code may have 4 errors leading to logical errors since the code distance is 4. An upper bound on this contribution to the output error probability is $3 \cdot 2^3 A_4 p^4$, where $A_4$ is the number of Z logical operators of the inner code of weight 4. The factor of $2^3$ is because one Z error on a qubit of the inner code can occur in one of two places, and the half of all such configurations lead to an accepted output. This is likely an overestimate because a logical error from a check out of three checks can be detected by a later check. In case of the Reed-Muller codes, one can see $A_4([[16, 6, 4]])=140, A_4([[32, 20, 4]])=620$, and $A_4([[64, 50, 4]])=2604$.

Using [[16, 6, 4]], the output error probability has leading term at most $9744p^4$ or $\bar{\epsilon}^{out}=3.2 \times 10^3 p^4$ per output, and the input T count is $\bar{n}_T=40$ per output CCZ. This particular protocol is worse in terms of input T count, but better in terms of space footprint (<25 qubits), than the protocol by a generalized triorthogonal code above or that of Cody Jones, "Composite toffoli gate with two-round error detection," Physical Review A 87, 052334 (2013), 1303.6971. Using [[32, 20, 4]] one sees $\bar{\epsilon}^{out} \approx (7.7 \times 10^3)p^4$ and $\bar{n}_T=27.2$. Using Reed-Muller [[64, 50, 4]], one sees $\bar{\epsilon}^{out}=(4.3 \times 10^4)p^4$ and $\bar{n}_T=23.4$. For large m, (encoding rate near 1) the input T count approaches 20 per output CCZ.

In this case, the acceptance probability has been ignored. Since the input CCZ states can be prepared independently using only 8 T gates, one may assume that the preparation is always successful. Termination of the protocol is due to nontrivial syndrome on the distance 4 code. Since there are 6n T gates, the overall acceptance probability is at least $(1-p)^{6n}$.

In the next section, another family is presented that has even lower asymptotic input T count.

VII. T-to-CCZ Protocols Using Normal Weakly Self-Dual CSS Codes

As an extension of Jeongwan Haah, Matthew B. Hastings, D. Poulin, and D. Wecker, "Magic state distillation with low space overhead and optimal asymptotic input count," 1703.07847v1., one can turn (three copies of) any normal weakly self-dual code (normal code) into a check routine of stabilizers of CCZ state, as follows.

Recall that a normal code is a weakly self-dual CSS code, defined by a self-orthogonal binary vector space $\mathcal{S}$ such that $\vec{1} \notin \mathcal{S}$. In such a code the binary vector space $\mathcal{S}/\mathcal{S}^\perp$ corresponding to the logical operators, has a basis such that any two distinct basis vectors have even overlap (orthogonal) but each of the basis vector has odd weight. Associating each basis vector to a pair of X- and Z-logical operators, a code can be obtained where the transversal Hadamard induces the product of all logical Hadamards.

Observe that in a normal code the transversal X anticommutes with every Z logical operator, and hence is equal to, up to a phase factor, the product of all X logical operator. In the standard sign choice of logical operators where every logical X is the tensor product of Pauli X, the transversal X is indeed equal to the product of all X logical operators. Likewise, the transversal Z is equal to the product of all Z logical operators. Then, it follows that control-Z across a pair of identical normal code blocks is equal to the product of control-Z operators over the pairs of logical qubits.

Therefore, given three copies, labeled A, B, C, of a normal code $[[n_{inner}, k_{inner}, d]]$, if one applies $\otimes_{i=1}^{n_{inner}} CZ_{Ai,Bi} X_{Ci}$, then the action on the code space is equal to $\otimes_{j=1}^{k_{inner}} \overline{CZ}_{Aj,Bj} \hat{X}_{Cj}$.

Having a transversal operator that induces the action of the stabilizer (CZ)X of CCZ-state the logical qubits, one can make a controlled version of this. The following identity can be used:

$$(CCZ)_{123}(^{C_a}X_1)(^{C_b}X_2)(^{C_c}X_3)(CCZ)_{123}=[^{C_a}(CZ_{23}X_1)]$$
$$[^{C_b}(CZ_{13}X_2)][^{C_c}(CZ_{12}X_3)] \qquad (VII.1)$$

which is the product of three stabilizers of CCZ-state controlled by three independent ancillas. The transversality of the logical operator (CZ)X implies that if one applies (VII.1) transversally across a triple of normal codes, then the three ancillas will know the eigenvalue of the three stabilizers of CCZ, respectively. The non-Clifford gate CCZ in (VII.1) can be injected using 4 T-gates. See Guang Song and Andreas Klappenecker, "Optimal realizations of simplied toffoli gates," Quantum Information and Computation 4, 361-372 (2004), and Cody Jones, "Low-overhead constructions for the fault-tolerant toffoli gate," Physical Review A 87, 022328 (2013), 1212.5069.

This method of measuring stabilizers of CCZ state, compared to that in the previous section using hyperbolic codes, has advantage that one does not have to repeat three times for each of three stabilizers, but has disadvantage that one needs roughly a factor of three space overhead. (The space overhead comparison is not completely fair, because a code cannot be simultaneously normal and hyperbolic. However, in the large code length limit this factor of 3 in the space overhead is appropriate.) In the large code length limit, this method also has an advantage in terms of T-count. Using the hyperbolic codes, even if the encoding rate is near one, one needs 12 T gates per CCZ-state under the test. On the other hand, using (VII.1) on a normal code of encoding rate near one, one needs 8 T gates per CCZ-state under the test.

Now the protocol at quartic order is as follows. Prepare $k_{inner}$ CCZ-states from the quadratic protocol using 4-qubit code. This consumes $8k_{inner}$ T-gates with independent error probability p. Embed them into the triple of normal code of parameter $[[n_{inner}, k_{inner}, 4]]$ with each qubit of the CCZ states into a different code block. Apply (VII.1); this step consumes $8n_{inner}$ T gates with independent error probability p. Upon no violation of code's stabilizers and ancilias, decode the logical qubits and output $k_{inner}$ CCZ states.

This is a quartic protocol as the output is faulty only if (i) an even number of CCZ states are faulty, which happens at order $(p^2)^2$, (ii) an odd number of input CCZ states are faulty but missed by a flipped ancilla outcome, which happens at order $p^2 \cdot p^2$, (iii) some error in the inner code is a logical error, which happens at order $p^d = p^4$, or (iv) some other error of higher order occurred. The total number of T gates used is $8k_{inner} + 8n_{inner}$.

There are normal codes of encoding rate greater than ⅔ and code distance 4 or higher on tens of cubits. including quantum BCH codes [[63, 45, 4]] (see Markus Grassl and Thomas Beth, "Quantum bch codes," in Proceedings X. International Symposium on Theoretical Electrical Engineering, Magdeburg (1999) pp. 207-212, quant-ph/9910060) and "H-codes" of parameters $[[k^2+4k+4, k^2, 4]]$ where k is even (see Cody Jones, "Multilevel distillation of magic states for quantum computing," Phys. Rev. A 87, 042305 (2013), 1210.3388v2).

Random constructions guarantee such codes of encoding rate near one in the limit of large code length. See A. R. Calderbank and Peter W. Shor, "Good quantum error-correcting codes exist," Phys. Rev. A 54, 1098-1105 (1996), quant-ph/9512032; Jeongwan Haah, Matthew B. Hastings, D. Poulin, and D. Wecker, "Magic state distillation with low space overhead and optimal asymptotic input count," 1703.07847v1.

The input T count in the current quartic protocol using a high rate inner code approaches 16 per output CCZ.

In terms of input T count, to the best of the authors' knowledge, this family is better than any previous T-to-CCZ protocol with quartic order of error reduction.

One can bootstrap the protocol to have a family of protocols for $d=2^\alpha$, $\alpha \geq 2$. The construction is inductive in $\alpha$. Fix an inner code $[[n_{inner}, k_{inner}, 4]]$. (This is for simplicity of presentation, and is not necessity.) The quartic protocol above is the base case in the induction. Suppose one has constructed a $2^\alpha$-th order protocol $P_\alpha$ and a $2^{\alpha-1}$-th order protocol $P_{\alpha-1}$ using $n_\alpha$, $n_{\alpha-1}$ T gates per output CCZ, respectively. The protocol is then: (1) Run $P_\alpha$ many times to prepare independent input states at error rate $p^{2^\alpha}$. (2) Embed them into the triples of the inner code. (3) Apply (VII.1) where CCZ-gates are injected by outputs from $P_{\alpha-1}$. (4) Upon no violation of the code's stabilizers, output the logical qubits. The order of reduction in error can be seen by considering the cases (i), (ii), and (iii) above. In all cases, the order of the error is $2 \cdot 2^\alpha = 2^{\alpha+1}$, $2^\alpha \cdot (2 \cdot 2^{\alpha-1}) = 2^{\alpha+1}$, or $4 \cdot 2^{\alpha-1} = 2^{\alpha+1}$. Step (1) takes $n_\alpha$ T-gates per CCZ state by induction hypothesis. For $k_{inner}$ sufficiently close to $n_{inner}$, step (3) takes $2n_{\alpha-1}$ T-gates per CCZ. Hence, $n_{\alpha+1} \simeq n_\alpha + 2n_{\alpha-1}$, and $$n_\alpha \simeq 4 \cdot 2^\alpha = 4d \qquad (VII.2)$$

since $n_1 = 8$ and $n_2 = 16$.

It is possible to combine the technology presented here with that of Earl T Campbell and Mark Howard, "Unified framework for magic state distillation and multiqubit gate synthesis with reduced resource cost," Physical Review A 95, 022316 (2017), 1606.01904v3 to reduce the input T-count at the expense of dealing with a larger batch. At d=2, Earl T Campbell and Mark Howard, "Unified framework for magic state distillation and multiqubit gate synthesis with reduced resource cost," Physical Review A 95, 022316 (2017), 1606.01904v3 has asymptotic T-count $n_1=6$. At d=4, using a high encoding rate normal code, the input T-count approaches $n_2=8+6=14$, instead of 16. At d=8, the count becomes $14+2 \cdot 6=26$, instead of 32. At a larger d that is a power of 2, in the limit of large code length, the T-count approaches $(⅔)(5 \cdot 2^\alpha + (-1)^\alpha)$ which is at most $3.33d+0.67$.

Note that this bootstrapping for large $\alpha$ must involve a quite large number of qubits to ensure the independence of the input CCZ states, and the CCZ-gates on the inner code. The usage of Earl T Campbell and Mark Howard, "Unified framework magic state distillation and multiqubit gate synthesis with reduced resource cost," Physical Review A 95, 022316 (2017), 1606.01904v3, further enlarges the necessary batch size.

Also of note is that for $d=2d' \geq 10$ with d' odd, one can first use the protocol of Jeongwan Haah, Matthew B. Hastings, D. Poulin, and D. Wecker, "Magic state distillation with low space overhead and optimal asymptotic input count," 1703.07847v1, to produce a T gate with error at d'-th order where $d' \geq 5$ is odd using $d'+o(1)$ T gates per output T, and then use T-to-CCZ protocol of Earl T Campbell and Mark Howard, "Unified framework for magic state distillation and multiqubit gate synthesis with reduced resource cost," Physical Review A 95, 022316 (2017), 1606.01904v3, to have CCZ states with error at $(d=2d')$-th order. This combination will give T count 3d per output CCZ.

VIII. Clifford Measurements to Check Matrices

Here, it is imagined that H-measurement routines are implemented sequentially to check $n_{out}$ magic states. (They may operate on disjoint sets of qubits, in which case they can be implemented in parallel, but one can always regard them as a sequential application of H-measurements, one at a time.) Here, the entire protocol is expressed as a collection of parity checks on all T-gates/states including those that are used to implement the H-measurement routines. Here, only normal codes are considered, and thus each H-measurement routine $\alpha$ consumes $2n_{inner}^{(\alpha)}$ T gates.

Under the stochastic error model, any possible error is of Y-type and hence corresponds to a bit string. Let $y^{(0)} = (y_1^{(0)}, \ldots, y_{n_{out}}^{(0)})$ denote any error bit string on the magic states that are tested. Let $y^{(\alpha)}$ for $\alpha=1, 2, \ldots, n_c$ denote the error bit string inside the $\alpha$-th H-measurement routine. Since there are two layers of T-gates on the inner code, $y^{(\alpha)}$ with $\alpha \geq 1$ must have even length; for notational convenience, we let the first half of $y^{(\alpha)}$ to be the error pattern before the layer of $^CZ$, and the second half to be that after $^CZ$. Thus, the error pattern in the entire protocol is represented by a bit vector $$y = (y^{(0)} y^{(1)} \ldots y^{(n_c)}) \qquad (VIII.1)$$

of length $n_T = n_{out} + 2\Sigma_{\alpha=1}^{n_c} n_{inner}^{(\alpha)}$, which is by definition equal to the total number of T-gates/states. The error bit vector will be regarded as a column vector ($n_T$-by-1 matrix).

The protocol specifies for each H-measurement routine $\alpha$ a set of magic states to be tested. This set $M^{(\alpha)}$ can be viewed as a bit string of length $n_{out}$; $M_i^{(\alpha)}=1$ if and only if the qubit i is included in the test by the routine $\alpha$. If an H-measurement routine $\alpha$ was perfect, then it would read off the parity of the error in $M^{(\alpha)}$, which is equal to $M^{(\alpha)} \cdot y^{(0)}$ over $\mathbb{F}_2$. As $M^{(\alpha)}$ will be used as a submatrix of a complete check matrix, regard $M^{(\alpha)}$ as a 1-by-$n_{out}$ matrix.

To take the outer measurement error into account, one can regard that any error on the pre-$^CZ$ layer is moved to the post-$^CZ$ layer:

$$(^{C_0}Z_j)Y_j = Z_0 Y_j (^{C_0}Z_j). \tag{VIII.2}$$

This convention allows us to consider only the pre-$^CZ$ errors in regards to the outer syndrome. That is, if the error pattern on magic states under the test is $y^{(0)}$, then the outer syndrome by an H-measurement routine $\alpha$ is given by $$M^{(\alpha)} y^{(0)} + \underbrace{(1\ 1\ \ldots\ 1\ 0\ 0\ \ldots\ 0)}_{(10) \otimes \vec{1}_{n_{inner}(\alpha)}} y^{(\alpha)} \bmod 2 \tag{VIII.3}$$

The error pattern $y^{(0)}$ is not necessarily the same as one proceeds from an H-measurement routine to the next. This is because there could be a logical error from the inner code that propagates to the magic states under the test. If a bit string $$\ell^{(\alpha)} = L^{(\alpha)}(y^{(\alpha)}) \tag{VIII.4}$$

denotes the error on the $n_{out}$ magic states, resulting from the logical error of $\alpha$-th routine, then after $\alpha$-th measurement routine the error pattern is $$y^{(0)}(\alpha) = y^{(0)}(0) + \ell^{(1)} + \ldots + \ell^{(\alpha)} \bmod 2 \tag{VIII.5}$$

and the outer syndrome by $\alpha$-th routine is given by $$M^{(\alpha)} y^{(0)}(0) + M^{(\alpha)} \ell_{(1)} + \ldots + M^{(\alpha)} \ell^{(\alpha-1)} + ((10) \otimes \vec{1}_{n_{inner}(\alpha)}) y^{(\alpha)} \cdot \bmod 2 \tag{VIII.6}$$

The function $L^{(\alpha)}$ that maps an error pattern inside inner code to a logical error has not yet been determined. This function is well-defined only if the encoded state on the inner code remains in the code space. The condition for the zero inner syndrome is given by commutation relations between an error operator and the stabilizers. Since the errors are of Y type and the stabilizers are from a weakly self-dual CSS code, the commutation relation can be read off from $$S^{(\alpha)}(y_{first\ half}^{(\alpha)} + y_{second\ half}^{(\alpha)}) = ((11) \otimes S^{(\alpha)}) y^{(\alpha)} \bmod 2 \tag{VIII.7}$$

where each row of $S^{(\alpha)}$ corresponds to a stabilizer generator. The sum of two halves is to account for the fact that a pair of errors on a single qubit in the inner code is equal to no error on that qubit in regards to inner syndrome. Conditioned on the zero inner syndrome, the function $L^{(\alpha)}$ can now be determined. An encoded qubit k is acted on by an Y-logical operator if and only if the logical X and Z operators of the logical qubit k both anticommute with a given Pauli operator. Since X and Z logical operators are represented by the same bit string $(L_{k,1}, L_{k,2}, \ldots, L_{k,n_{inner}(\alpha)})$ under the magic basis of logical operators that is chosen, the logical Y on logical qubit k is enacted if and only if $$(L_{k,1}, L_{k,2}, \ldots, L_{k,n_{inner}}^{(\alpha)}) \cdot (y_{first\ half}^{(\alpha)} + y_{second\ half}^{(\alpha)}) = 1 \bmod 2. \tag{VIII.8}$$

Therefore, the function $L^{(\alpha)}$ is linear over $\mathbb{F}_2$ whose matrix has rows that correspond to logical operators. Since a routine $\alpha$ may not act on the all $n_{out}$ qubits, the matrix $L^{(\alpha)}$, which is $n_{out}$-by-$n_{inner}^{(\alpha)}$, has nonzero rows only for the support of $M^{(\alpha)}$. In addition, the choice of the logical operators according to a normal magic basis ensures that the nonzero rows of $L^{(\alpha)}$ are orthonormal.

$$\sum_{j=1}^{n_{inner}(\alpha)} L_{kj}^{(\alpha)} L_{k',j}^{(\alpha)} = M_k^{(\alpha)} \delta_{kk'} \bmod 2. \tag{VIII.9}$$

Thus, the necessary ingredients for a complete check matrix have been collected: A representation of errors (VIII.1), the outer syndrome (VIII.6), and the inner syndrome (VIII.7).

$$\mathfrak{C}_0 = \begin{bmatrix} M^{(1)} & (10) \otimes \vec{1} & & & & \\ M^{(2)} & M^{(2)}((11) \otimes L^{(1)}) & (10) \otimes \vec{1} & & & \\ M^{(3)} & M^{(3)}((11) \otimes L^{(1)}) & M^{(3)}((11) \otimes L^{(2)}) & (10) \otimes \vec{1} & & \\ \vdots & \vdots & \vdots & \vdots & \ddots & \\ M^{(n_c)} & M^{(n_c)}((11) \otimes L^{(1)}) & M^{(n_c)}((11) \otimes L^{(2)}) & \ldots & \ldots & (10) \otimes \vec{1} \\ \hline & (11) \otimes S^{(1)} & & & & \\ & & (11) \otimes S^{(2)} & & & \\ & & & \ddots & & \\ & & & & (11) \otimes S^{(n_c-1)} & \\ & & & & & (11) \otimes S^{(n_c-1)} \end{bmatrix} \tag{VIII.10}$$

where the blank entries are zero, and the vertical lines are to facilitate reading. In the outer syndrome block each displayed row is a single row, whereas in the inner syndrome block each displayed entry is a submatrix. The propagated error from the inner codes to the output magic states is inscribed in (VIII.5), which one can represent as a linear map $$\mathfrak{C}_1 = [I_{n_{out}} | (11) \otimes L^{(1)} | (11) \otimes L^{(2)} | (11) \otimes L^{(3)} | \ldots | (11) \otimes L^{(n_c)}]. \tag{VIII.11}$$

The vertical lines are aligned with those of $\mathfrak{C}_0$.

The following theorem has been arrived at:

Theorem 2. When the error pattern of all T-gates and states is y, the protocol accepts the output if and only if $\mathfrak{C}_0 y = 0$, and the accepted output does not contain an error if and only if $\mathfrak{C}_1 y = 0$.

IX. Orthogonal Bases at Level v

In this section, it is implicit that the element of $\mathbb{F}_2$ is promoted to an integer in $\mathbb{Z}$. The association is such that $\mathbb{F}_2 \ni 0 \mapsto 0 \in \mathbb{Z}$ and $\mathbb{F}_2 \ni 1 \mapsto 1 \in \mathbb{Z}$. Likewise, any element of $\mathbb{Z}/2^v\mathbb{Z}$ will be represented by an integer from 0 to $2^v-1$ of $\mathbb{Z}$. Unless noted by "mod $2^v$," all arithmetics are over the usual integers $\mathbb{Z}$. However, every vector space is over $\mathbb{F}_2$. Here, a matrix is regarded as a set of rows. The r-th row of a matrix A is denoted as $A_{r,*}$.

Definition 2. Consider a vector space $\mathbb{F}_2^n$ equipped with an odd integer vector $t \in (2\mathbb{Z}+1)^n$, called a coefficient vector. Let $v \geq 2$. The norm at level v (v-norm) of $v \in \mathbb{F}_2^n$ is $\|v\|_v = \Sigma_i v_i t_i$ mod $2^v$. Two vectors v and w are orthogonal at level v (v-orthogonal) if $\Sigma_i v_i w_i t_i = 0$ mod $2^{v-1}$. Two subspaces V, W are v-orthogonal if any $v \in V$ and $w \in W$ are v-orthogonal. A set of vectors $\{g^{(1)}, \ldots, g^{(k)}\}$ is v-orthogonal if any two disjoint subsets span v-orthogonal subspaces. A v-orthogonal set is v-orthonormal if all members have v-norm 1. A v-orthogonal set or subspace is v-null of all members have v-norm 0. To emphasize the coefficient vector t, we will sometimes write (v,t)-orthogonal, -norm ($\|\cdot\|_{v,t}$), -null, -orthonormal.

The v-orthogonality is a generalization of an existing notion that is considered for transversal T-gates (Aleksander Kubica and Michael E. Beverland, Universal transversal gates with color codes—a simplified approach, Phys. Rev. A 91, 032330 (2015), 1410.0069v1; Sergey Bravyi and Andrew Cross, Doubled color codes, 1509.03239v1); previously, a coefficient vector had components ±1. Being 2-orthogonal is equivalent to being orthogonal under the usual dot product over $\mathbb{F}_2$. Being 2-null or 2-orthonormal is nontrivial, but is easily satisfied as Lemma 5 below shows. As will be seen shortly, an orthogonal matrix at level 3 is triorthogonal (Sergey Bravyi and Jeongwan Haah, Magic state distillation with low overhead, Phys. Rev. A 86, 052329 (2012), 1209.2426) since $t_i$ is odd, but one does not know whether every triorthogonal matrix is orthogonal at level 3 for some coefficient vector t. Examples of triorthogonal matrices in literature are believed to actually be orthogonal at level 3.

Now, equivalent conditions for the v-orthogonality are given, as an application of a result by Harold N. Ward, Weight polarization and divisibility, Discrete Mathematics 83, 315326 (1990); see also Sergey Bravyi and Jeongwan Haah, Magic state distillation with low overhead, Phys. Rev. A 86, 052329 (2012), 1209.2426. It will be very convenient to introduce the following notation. It is customary to denote a matrix element as $A_{ai}$ for a matrix A. One can write $A^*_{ai}$ for any unordered set of row labels $a\{a_1, \ldots, a_m\}$ (whose cardinality a |a| equal to m), to denote $$A^*_{ai} = A_{a_1,i} A_{a_2,i} \cdots A_{a_m,i}. \quad (IX.1)$$

If $|a|=0$, then $A^*_{ai}=1$ by convention. By definition, $|a|$ cannot be larger than the number of rows of A.

Lemma 4. Let t be a coefficient vector of length n. Let A be a binary matrix with n columns where the rows are $\mathbb{F}_2$-linearly independent. The following are equivalent:
  (i) The rows of A form a (v,t)-orthogonal set.
  (ii) For any subset K of rows of A, $\|\Sigma_{r \in K} A_{r,*} \text{ mod } 2\|_{v,t} = \Sigma_{r \in K} \|A_{r,*}\|_{v,t}$ mod $2^v$.
  (iii) $2^{|a|-1} \Sigma_i A^*_{ai} t_i = 0$ mod $2^v$ for any a such that $2 \leq |a| \leq v$.
In particular, every vector in a subspace $S \subseteq \mathbb{F}_2^n$ has zero (v,t)-norm if and only if any spanning set $S$ is (v,t)-null.

As an example, if the rows of a binary matrix A is v-null with respect to $t=\vec{1}$, then any vector in the row $\mathbb{F}_2$-span of A has weight divisible by $2^v$. More concretely, the rows of $$\begin{bmatrix} 1 & 0 & 1 & 0 & 1 & 0 & 1 \\ 0 & 1 & 1 & 0 & 0 & 1 & 1 \\ 0 & 0 & 0 & 1 & 1 & 1 & 1 \end{bmatrix} \quad (IX.2)$$

are 2-null with respect to $t=\vec{1}$ and span a doubly even subspace.

Proof. If y is a binary vector of weight |y|, then the parity $\epsilon(y)=0, 1$ of its weight can be expressed as $$\epsilon(y) = \frac{1}{2}(1-(1-2)^{|y|}) = \sum_{p=1}^{|y|} \binom{|y|}{p}(-2)^{p-1}. \quad (IX.3)$$

The binomial factor is equal to the number of ways to choose nonzero components of y. Hence, $$\epsilon(y) = \sum_{a \neq \emptyset} (-2)^{|a|-1} y^*_a \text{ mod } 2^v \quad (IX.4)$$

where a vector y is treated as a column matrix. In other words, if a vector g is the sum of rows of B over $\mathbb{F}_2$, then $$g_i = \sum_{a \neq \emptyset} (-2)^{|a|-1} B^*_{ai} \text{ mod } 2^v. \quad (IX.5)$$

(i)⇒(ii): It suffices to prove the claim when K consists of two rows, say $A_{1,*}$ and $A_{2,*}$ since a more general case follows by induction in the cardinality of K. By (IX.5), $\|A_{1,*}+A_{2,*}$ mod $2\|_v = \|A_{1,i}+A_{2,i}-2A_{1,i}A_{2,i}\|_v = \|A_{1,*}\|_v + \|A_{2,*}\|_v - 2\Sigma_i A_{1,i} A_{2,i} t_i$ mod $2^v$. The last term vanishes because the rows of A are v-orthogonal.

(ii)⇒(iii): By (IX.5), one has $$0 = \left\|\sum_{r \in K} A_{r,*} \text{ mod } 2\right\|_v - \sum_{r \in K} \|A_{r,*}\|_v = \sum_{a \subseteq K, |a| \geq 2} \sum_i (-2)^{|a|-1} A^*_{ai} t_i \text{ mod } 2^v, \quad (IX.6)$$

Taking K such that $|K|=2$, we see (iii) in the case of $|a|=2$. Using induction in $|K|$, one is done.

(iii)⇒(i): Let K and K' be two disjoint sets of rows of A. We have to show that $v = \Sigma_{r \in K} A_{r,*}$ mod 2 and $w = \Sigma_{r \in K'} A_{r,*}$ mod 2 are v-orthogonal. Using (IX.5).

$$(-2)\sum_i v_i w_i t_i = \sum_{\emptyset \neq a \subseteq K} \sum_{\emptyset \neq b \subseteq K'} (-2)^{|a|+|b|-1} \sum_i A^*_{ai} A^*_{bi} t_i \text{ mod } 2^v \quad (IX.7)$$

$$= \sum_{\emptyset \neq c \subseteq K \cup K'} (-2)^{|c|-1} \sum_i A^*_{ci} t_i = 0 \text{ mod } 2^v \quad (IX.8)$$

where the second equality is because a and b are disjoint,

Lemma 5. Let S and L be rectangular matrices of $\mathbb{F}_2$-linearly independent rows such that $SS^T=0$ mod 2, $SL^T=0$ mod 2, and $LL^T = I \mod 2$. Then, there exists an odd integer coefficient vector t, with respect to which $$G = \begin{bmatrix} L \\ S \end{bmatrix}$$

is 2-orthogonal, L is 2-orthonormal, and S is 2-null.

Proof. Only nontrivial is to claim that there exists a coefficient vector t such that $\Sigma_i S_{ai} t_i = 0 \mod 4$ and $\Sigma_i L_{bi} t_i = 1 \mod 4$ for any a, b. An odd integer solution t to these equations are found by Lemma 6 below, since these equations have solution $t = \vec{1} \mod 2$.

Lemma 6. Let A be a binary matrix with linearly independent rows over $\mathbb{F}_2$. If an inhomogeneous linear equation $Ax = v$ has a solution $x = u^{(v-1)}$ over $\mathbb{Z}/2^{v-1}\mathbb{Z}$ where $v \geq 2$, then the same equation has a solution $x = u^{(v)}$ over $\mathbb{Z}/2^v\mathbb{Z}$ such that $u^{(v)} = u^{(v-1)} \mod 2^{v-1}$.

Proof. The proof is by induction in the number of rows of A. When there is only one row in A, the scalar (a one-dimensional column vector) $A u^{(v-1)} - v \mod 2^v$ is either 0 or $2^{v-1}$. One can subtract this even number from the component of $u^{(v-1)}$ where A has the first nonzero entry. The matrix A must have such nonzero entry because the row is linearly independent over $\mathbb{F}_2$. This proves the claim in the base case.

To prove the induction step when A has more than one row, consider Gauss elimination over $\mathbb{Z}/2^v\mathbb{Z}$ to transform A into $(1) \oplus A'$ up to permutations of columns. Such Gauss elimination is possible because the rows of A are $\mathbb{F}_2$-linearly independent, and any odd number is invertible in $\mathbb{Z}/2^v\mathbb{Z}$. One finds a solution $u^{(v)}|_2, \ldots$ for the A' part over $\mathbb{Z}/2^v\mathbb{Z}$ by the induction hypothesis, and then fixes the first component, if necessary, as in the base case.

X. Level Lifting

Theorem 3. Let $$G^{(\alpha)} = \begin{bmatrix} L^{(\alpha)} \\ S^{(\alpha)} \end{bmatrix}$$

be a $(v, t^{(\alpha)})$-orthogonal binary matrix of $n_{inner}^{(\alpha)}$ columns for $\alpha = 1, 2, \ldots, n_c$, where $S^{(\alpha)}$ is $(v, t^{(\alpha)})$-null and consists of $\mathbb{F}_2$-linearly independent rows, $L^{(\alpha)}$ has $n_{out}$ rows, an the nonzero rows of $L^{(\alpha)}$ is $(v, t^{(\alpha)})$-orthonormal. Assume that $$\sum_k \sum_{i=1}^{n_{inner}^{(\alpha)}} L_{ki}^{(\alpha)} t_i^{(\alpha)} = \sum_i t_i^{(\alpha)} \mod 2^v. \tag{X.1}$$

Let $M_{\alpha*}$ be a row binary vector defined as $M_{\alpha k} = 1$ if and only if $L_{k*}^{(\alpha)}$ is nonzero. Then, the following matrix $\mathfrak{C}$ is $(v+1)$-orthogonal with respect to some coefficient vector t. $\mathfrak{C}_\ell$ is $(v+1, t)$-orthonormal, and $\mathfrak{C}_{out}$ and $\mathfrak{C}_{in}$ are $(v+1, t)$-null. Furthermore, $\Sigma_{r,i} (\mathfrak{C}_\ell)_{ri} t_i = \Sigma_i t_i$.

$$\begin{bmatrix} \mathfrak{C}_\ell \\ \mathfrak{C}_{out} \\ \mathfrak{C}_{in} \end{bmatrix} = \begin{bmatrix} I_{n_{out}} & (11) \otimes L^{(1)} & (11) \otimes L^{(2)} & (11) \otimes L^{(3)} & \ldots & (11) \otimes L^{(n_c)} \\ M_{1*} & (10) \otimes \vec{1} & & & & \\ M_{2*} & M_{2*}((11) \otimes L^{(1)}) & (10) \otimes \vec{1} & & & \\ M_{3*} & M_{3*}((11) \otimes L^{(1)}) & M_{3*}((11) \otimes L^{(2)}) & (10) \otimes \vec{1} & & \\ \vdots & \vdots & \vdots & \vdots & \ddots & \\ M_{n_c*} & M_{n_c*}((11) \otimes L^{(1)}) & M_{n_c*}((11) \otimes L^{(2)}) & \ldots & \ldots & (10) \otimes \vec{1} \\ & (11) \otimes S^{(1)} & & & & \\ & & (11) \otimes S^{(2)} & & & \\ & & & \ddots & & \\ & & & & (11) \otimes S^{(n_c-1)} & \\ & & & & & (11) \otimes S^{(n_c)} \end{bmatrix} \tag{X.2}$$

Proof. We will find t of form (written as a row vector modulo $2^v$)

$$t = [\vec{1}_{n_{out}} | (-11) \otimes t^{(1)} | (-11) \otimes t^{(2)} | (-11) \otimes t^{(3)} | \ldots | (-11) \otimes t^{(n_c)}]. \tag{X.3}$$

It is clear that $\Sigma_{r,i} (\mathfrak{C}_\ell)_{ri} t_i = \Sigma_i t_i$, even without modulo reduction. It is also clear from the choice of t that the $(v+1, t)$-norms of rows are one for those in $\mathfrak{C}_\ell$, and zero for those in $\mathfrak{C}_{in}$. This does not depend on $t^{(\alpha)}$. To calculate the norm of a row in $\mathfrak{C}_{out}$, one can observe that $$\sum_{i=1}^{n_{inner}^{(\alpha)}} L_{ki}^{(\alpha)} L_{k'i}^{(\alpha)} t_i^{(\alpha)} = M_{\alpha k} \delta_{kk'} \mod 2^v, \tag{X.4}$$

which, together with (X.1), implies any row in $\mathfrak{C}_{out}$ has $(v, t)$-norm zero. To make the $(v+1)$-norm zero, apply Lemma 6 to $\mathfrak{C}_{out}$ since $\mathfrak{C}_{out}$ is in a row echelon form which ensures $\mathbb{F}_2$-linear independence. It will add $2^v$ to some components of t, if necessary. One is left with the $(v+1, t)$-orthogonality, which is not affected by the modification to t by Lemma 6 since one will only need to evaluate sums modulo $2^v$.

It is desirable to show that given $2 \leq m \leq v+1$ rows, the weighted sum of their overlap is zero modulo $2^{v+2-m}$. Note that any part of the overlap that contains (11) tensor factor has no contribution to the weighted sum due to (X.3). Let a be a label set of chosen rows of $\mathfrak{C}$, b be that of $\mathfrak{C}_{out}$, and c be that of $\mathfrak{C}_{in}$.

$|a| \geq 2$ or $|c| \geq 1$:

If $|b| = 0$, there is always a tensor factor (11). So, assume $|b| \geq 1$. Except for the part with the tensor factor (11), we must show $$2^{|a|+|b|+|c|-1} \sum_i L_{ai}^* N_{b'i}^* S_{ci}^* t_i^{(\alpha)} = 0 \mod 2^{v+1} \tag{X.5}$$

where $L=L^{(\alpha)}$, $S=S^{(\alpha)}$, $N_{bi}=\Sigma_j M_{bj} L_{ji}^{(\alpha)}$ mod 2 for some $\alpha$ such that $b=\{\alpha\}\sqcup b'$. Note that $|b|=1+|b'|$. Expanding $N^*_{b'i}$ using (IX.5), the left-hand side becomes a ±-sum of terms $$2^{|a|+|b|+|c|+\sum_{j=1}^{|b'|}(|\partial^{(j)}|-1)}\sum_i L^*_{ai}L^*_{\partial(1)_i}\ldots L^*_{\partial(|b'|)_i}S^*_{ci}t_i^{(\alpha)}. \quad (X.6)$$

From the assumption of v-orthogonality of $G^{(\alpha)}$, one has $$2^{|a\cup_j \partial^{(j)}|+|c|}\sum_i L^*_{ai}L^*_{\partial(1)_i}\ldots L^*_{\partial(|b'|)_i}S^*_{ci}t_i^{(\alpha)} = 0 \bmod 2^{v+1} \quad (X.7)$$

if $|a\cup_j \partial^{(j)}|+|c|\geq 2$ or $a=b'=\emptyset$.

The condition $|a\cup_j \tilde{d}^{(j)}|+|c|\geq 2$ or $a=b'=\emptyset$ is always true in the present case. Comparing the exponent of 2 in (X.6) and that in (X.7), we see that (X.6) is zero modulo $2^{v+1}$.

$a=\{a\}$ and $c=\emptyset$:

Since one is choosing at least two rows, $|b|\geq 1$. Dropping the part with the tensor factor (11), one desirably shows $$2^{|b|}M^*_{ba} - 2^{|b|}\sum_i L_{ai}N^*_{b'i}t_i^{(b_1)} = 0 \bmod 2^{v+1} \quad (X.8)$$

where $L=L^{(b_1)}$, $N_{bi}=\Sigma_j M_{bj} L_{ji}^{(b_1)}$ mod 2, and $b=\{b_1\}\sqcup b'$. Expanding $N^*_{b'i}$ using (IX.5), the second term becomes a ±-sum of terms $$2^{|b'|+1+\sum_{j=1}^{|b'|}(|\partial^{(j)}|-1)}\sum_i L^*_{ai}L^*_{\partial(1)_i}\ldots L^*_{\partial(|b'|)_i}t_i^{(b_1)}. \quad (X.9)$$

From the assumption of v-orthogonality of $G^{(b_1)}$, one has $$2^{|a\cup_j \partial^{(j)}|}\sum_i L^*_{ai}L^*_{\partial(1)_i}\ldots L^*_{\partial(|b'|)_i}t_i^{(b_1)} = 0 \bmod 2^{v+1} \quad (X.10)$$

if $|a\cup_j \partial^{(j)}|\geq 2$.

Comparing the exponents of 2 of the last two expressions, one sees that only the terms with $a\cup_j \tilde{c}^{(j)}=a$ in (X.8) may survive. Hence, (X.8) is equivalent to $$2^{|b'|}M^*_{ba} - 2^{|b'|}\sum_i L_{ai}M^*_{b'a}t_i^{(b_1)} = 0 \bmod 2^v, \quad (X.11)$$

but one knows this is satisfied since $\Sigma_i L_{ai}^{(b_1)}t_i^{(b_1)}=M_{b_1 a}$ mod $2^v$ by (X.4) and v-orthogonality of $G^{(b_1)}$.

$a=c=\emptyset$:

Except for the part with the tensor factor (11), one desirably shows $$2^{|b|-1}\sum_k M^*_{bk} - 2^{|b|-1}\sum_i N^*_{b'i}t_i^{(b_1)} = 0 \bmod 2^{v+1} \quad (X.12)$$

where $L=L^{(b_1)}$, $S=S^{(\alpha)}$, $N_{bi}=\Sigma_j M_{bj} L_{ji}^{(b_1)}$ mod 2, and $b=\{b_1\}\sqcup b'$. By assumption, $|b'|\geq 1$. Expanding $N^*_{b'i}$ using (IX.5), the second term becomes a ±-sum of terms $$2^{|b'|+\sum_{j=1}^{|b'|}(|\partial^{(j)}|-1)}\sum_i L^*_{\partial(1)_i}\ldots L^*_{\partial(|b'|)_i}t_i^{(b_1)}. \quad (X.13)$$

From the assumption of v-orthogonality of $G^{(b_1)}$, one has $$2^{|\cup_j \partial^{(j)}|}\sum_i L^*_{\partial(1)_i}\ldots L^*_{\partial(|b'|)_i}t_i^{(b_1)} = 0 \bmod 2^{v+1} \quad (X.14)$$

if $|\cup_j \partial^{(j)}|\geq 2$.

Comparing the exponents of 2 of the last two expressions, one sees that only the terms with $\tilde{c}^{(j)}=\{d\}$ in (X.12) may survive. Hence, (X.12) is equivalent to $$2^{|b'|}\sum_k M^*_{bk} - 2^{|b'|}\sum_i M^*_{b'd}L_{di}t_i^{(b_1)} = 0 \bmod 2^{v+1}, \quad (X.15)$$

but one knows this is satisfied since $\Sigma_i L_{di}^{(b_1)}t_i=M_{b_1 d}$ mod $2^v$ by (X.4).

The orthogonality condition (iii) in Lemma 4 has thus been shown, and the proof is completed.

XI. Example Computing Environments

FIG. 1 illustrates a generalized example of a suitable computing environment 100 in which several of the described embodiments can be implemented. The computing environment 100 is not intended to suggest any limitation as to the scope of use or functionality of the disclosed technology, as the techniques and tools described herein can be implemented in diverse general-purpose or special-purpose environments that have computing hardware.

With reference to FIG. 1, the computing environment 100 includes at least one processing device 110 and memory 120. In FIG. 1, this most basic configuration 130 is included within a dashed line. The processing device 110 (e.g., a CPU or microprocessor) executes computer-executable instructions. In a multi-processing system, multiple processing devices execute computer-executatable instructions to increase processing power. The memory 120 may be volatile memory (e.g., registers, cache, RAM, DRAM, SRAM), non-volatile memory (e.g., ROM, EEPROM, flash memory), or some combination of the two. The memory 120 stores software 180 implementing tools for implementing the quantum circuit (e.g., the Magic state distillation protocols, circuits, and associated techniques) as described herein.

The computing environment can have additional features. For example, the computing environment 100 includes storage 140, one or more input devices 150, one or more output devices 160, and one or more communication connections 170. An interconnection mechanism (not shown), such as a bus, controller, or network, interconnects the components of the computing environment 100. Typically, operating system software (not shown) provides an operating environment for other software executing in the computing environment 100, and coordinates activities of the components of the computing environment 100.

The storage 140 can be removable or non-removable, and includes one or more magnetic disks (e.g., hard drives), solid state drives (e.g., flash drives), magnetic tapes or cassettes, CD-ROMs, DVDs, or any other tangible non-volatile storage medium which can be used to store information and which can be accessed within the computing environment 100. The storage 140 can also store instructions for the software 180 implementing the quantum circuits, protocols, and techniques described herein.

The input device(s) 150 can be a touch input device such as a keyboard, touchscreen, mouse, pen, trackball, a voice input device, a scanning device, or another device that provides input to the computing environment 100. The output device(s) 160 can be a display device (e.g., a computer monitor, laptop display, smartphone display, tablet display, netbook display, or touchscreen), printer, speaker, or another device that provides output from the computing environment 100.

The communication connection(s) 170 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

As noted, the various methods for generating the disclosed circuits (e.g., for compiling/synthesizing the circuits) can be described in the general context of computer-readable instructions stored on one or more computer-readable media. Computer-readable media are any available media (e.g., memory or storage device) that can be accessed within or by a computing environment. Computer-readable media include tangible computer-readable memory or storage devices, such as memory 120 and/or storage 140, and do not include propagating carrier waves or signals per se (tangible computer-readable memory or storage devices do not include propagating carrier waves or signals per se).

Various embodiments of the methods disclosed herein can also be described in the general context of computer-executable instructions (such as those included in program modules) being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

Figure 2:
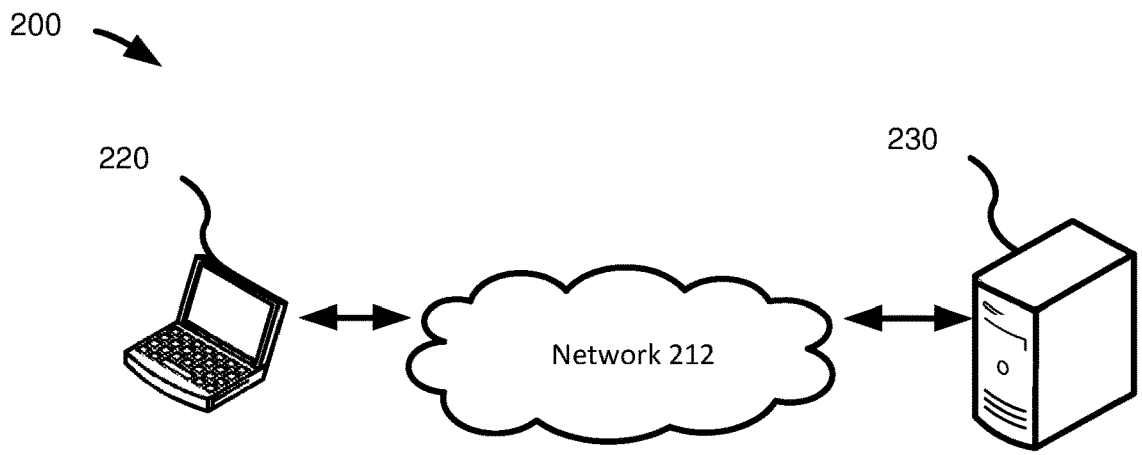
FIG. 2 illustrates an example of a possible network topology (e.g., a client-server network) for implementing a system according to the disclosed technology.

An example of a possible network topology 200 (e.g., a client-server network) for implementing a system according to the disclosed technology is depicted in FIG. 2. Networked computing device 220 can be, for example, a computer running a browser or other software connected to a network 212. The computing device 220 can have a computer architecture as shown in FIG. 1 and discussed above. The computing device 220 is not limited to a traditional personal computer but can comprise other computing hardware configured to connect to and communicate with a network 212 (e.g., smart phones, laptop computers, tablet computers, or other mobile computing devices, servers, network devices, dedicated devices, and the like). In the illustrated embodiment, the computing device 220 is configured to communicate with a computing device 230 (e.g., a remote server, such as a server in a cloud computing environment) via a network 212. In the illustrated embodiment, the computing device 220 is configured to transmit input data to the computing device 230, and the computing device 230 is configured to implement any of the quantum circuits or protocols disclosed herein (e.g., compiling/synthesizing the quantum circuit (for instance, a quantum circuit including circuit elements for implementing the magic state distillation procedures) front a higher-level circuit description) and outputting results to the computing device 220. Any of the data received from the computing device 2930 can be stored or displayed on the computing device 2920 (e.g., displayed as data on a graphical user interface or web page at the computing devices 220). In the illustrated embodiment, the illustrated network 212 can be implemented as a Local Area Network (LAN) using wired networking (e.g., the Ethernet IEEE standard 802.3 or other appropriate standard) or wireless networking (e.g. one of the IEEE standards 802.11a, 802.11b, 802.11g, or 802.11n or other appropriate standard). Alternatively, at least part of the network 212 can be the Internet or a similar public network and operate using an appropriate protocol (e.g., the HTTP protocol).

Figure 3:
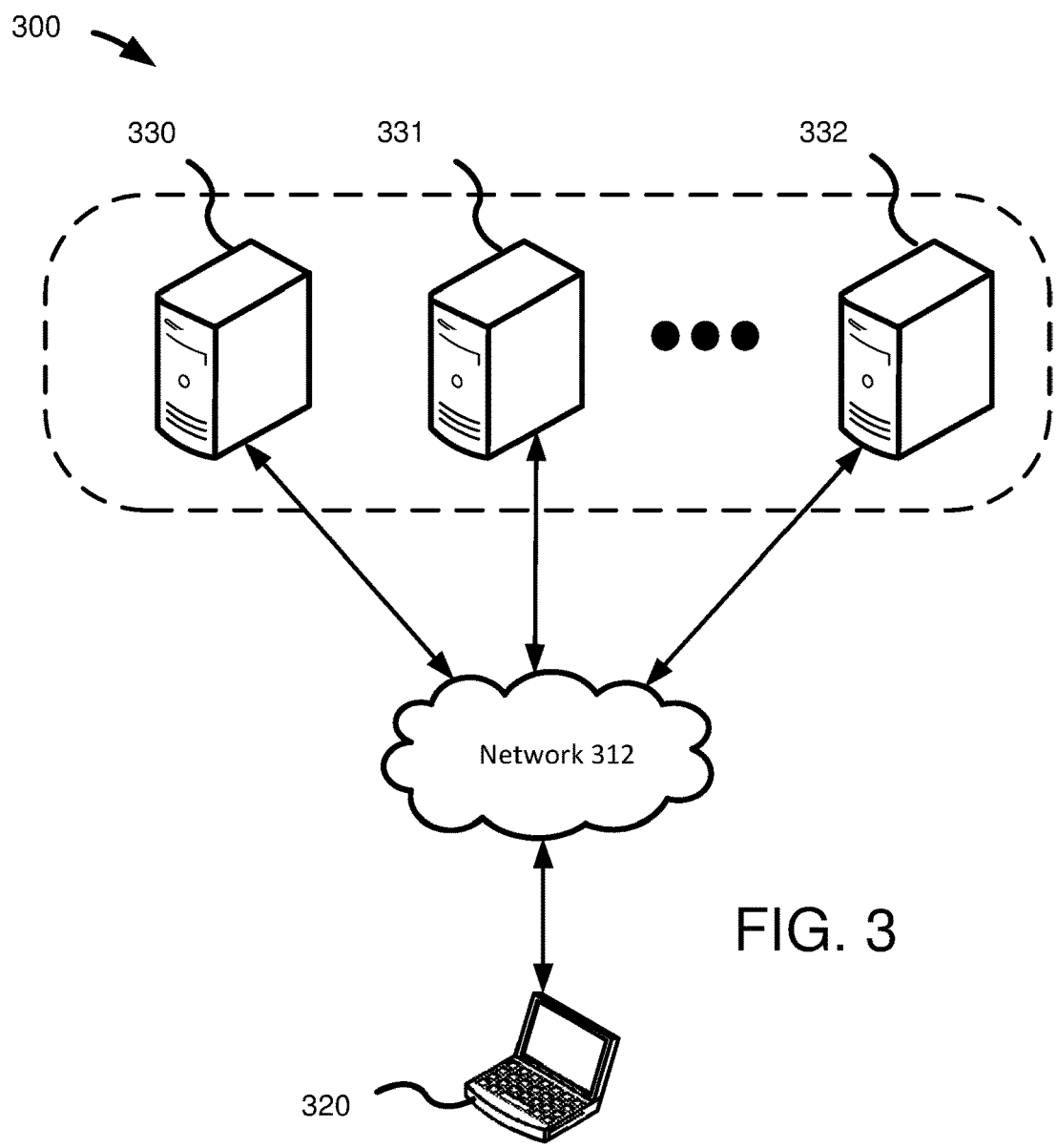
FIG. 3 illustrates another example of a possible network topology (e.g., a distributed computing environment) for implementing a system according to the disclosed technology.

Another example of a possible network topology 300 (e.g., a distributed computing environment) for implementing a system according to the disclosed technology is depicted in FIG. 3. Networked computing device 320 can be, for example, a computer running a browser or other software connected to a network 312. The computing device 320 can have a computer architecture as shown in FIG. 1 and discussed above. In the illustrated embodiment, the computing device 320 is configured to communicate with multiple computing devices 330, 331, 332 (e.g., remote servers or other distributed computing devices, such as one or more servers in a cloud computing environment) via the network 312. In the illustrated embodiment, each of the computing devices 330, 331, 332 in the computing environment 300 is used to perform at least a portion of any of the quantum circuits disclosed herein. In other words, the computing devices 330, 331, 332 form a distributed computing environment in which the quantum circuit implementation process is shared across multiple computing devices. The computing device 320 is configured to transmit input data to the computing devices 330, 331, 332, which are configured to distributively implement any of the quantum circuit processes disclosed herein (e.g., compiling/synthesizing the quantum circuit from a higher-level circuit description) and to provide results to the computing device 320. Any of the data received from the computing devices 330, 331, 332 can be stored or displayed on the computing device 320 (e.g., displayed as data on a graphical user interface or web page at computing devices 320). The illustrated network 312 can be any of the networks discussed above with respect to FIG. 2.

Figure 4:
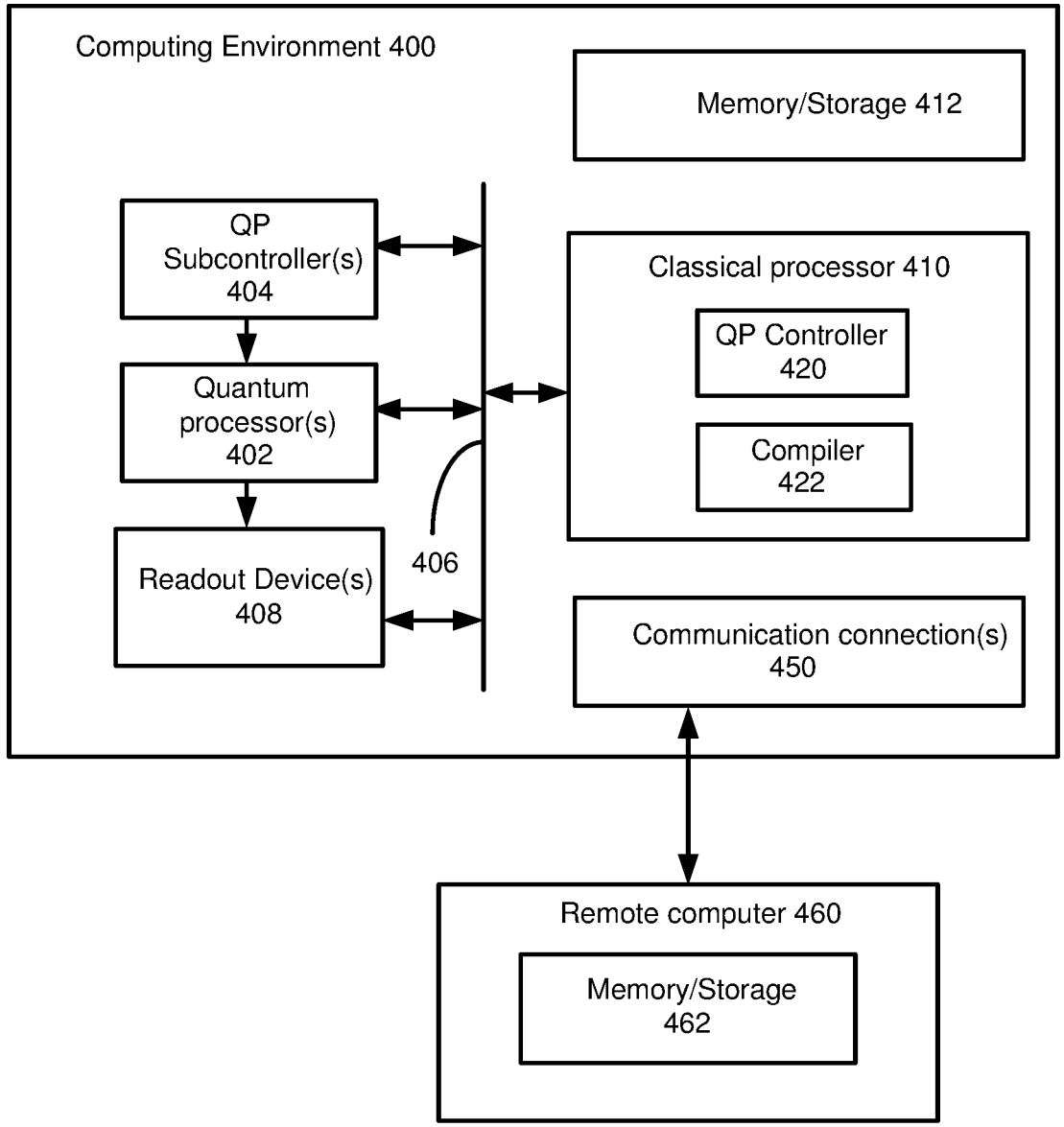
FIG. 4 illustrates an exemplary system for implementing embodiments of the disclosed technology.

With reference to FIG. 4, an exemplary system for implementing embodiments of the disclosed technology includes computing environment 400. In computing environment 400, a compiled, quantum computer circuit description, including a circuit description for one or more magic state distillation circuits as disclosed herein, can be used to program (or configure) one or more quantum processing units such that the quantum processing unit(s) implement the circuit described by the quantum computer circuit description. The quantum computer circuit description can implement any of the magic state distillation circuits discussed herein.

The environment 400 includes one or more quantum processing units 402 and one or more readout device(s) 408. The quantum processing unit(s) execute quantum circuits that are precompiled and described by the quantum computer circuit description. The quantum processing unit(s) can be one or more of, but are not limited to: (a) a superconducting quantum computer; (b) an ion trap quantum computer; (c) a fault-tolerant architecture for quantum computing; and/or (d) a topological quantum architecture (e.g., a topological quantum computing device using Majorana zero modes). The precompiled quantum circuits, including any of the disclosed circuits or circuits for implementing the disclosed protocols, can be sent into (or otherwise applied to) the quantum processing unit(s) via control lines 406 at the control of quantum processor controller 420. The quantum processor controller (QP controller) 420 can operate in conjunction with a classical processor 410 (e.g., having an architecture as described above with respect to FIG. 1) to implement the desired quantum computing process. Further, the classical processor 410 can be programmed to implement any of the disclosed methods and/or protocols.

In the illustrated example, the QP controller 420 further implements the desired quantum computing process via one or more QP subcontrollers 404 that are specially adapted to control a corresponding one of the quantum processor(s) 402. For instance, in one example, the quantum controller 420 facilitates implementation of the compiled quantum circuit by sending instructions to one or more memories (e.g., lower-temperature memories), which then pass the instructions to low-temperature control unit(s) (e.g., QP subcontroller(s) 404) that transmit, for instance, pulse sequences representing the gates to the quantum processing unit(s) 402 for implementation. In other examples, the QP controller(s) 420 and QP subcontroller(s) 404 operate to provide appropriate magnetic fields, encoded operations, or other such control signals to the quantum processor(s) to implement the operations of the compiled quantum computer circuit description. The quantum controller(s) can further interact with readout devices 408 to help control and implement the desired quantum computing process (e.g., by reading or measuring out data results from the quantum processing units once available, etc.)

With reference to FIG. 4, compilation is the process of translating a high-level description of a quantum algorithm into a quantum computer circuit description comprising a sequence of quantum operations or gates, which can include any of the magic state distillation circuits as disclosed herein. The compilation can be performed by a compiler 422 using a classical processor 410 (e.g., as shown in FIG. 1) of the environment 400 which loads the high-level description from memory or storage devices 412 and stores the resulting quantum computer circuit description in the memory or storage devices 412.

In other embodiments, compilation can be performed remotely by a remote computer 400 (e.g., a computer having a computing environment as described above with respect to FIG. 1) which stores the resulting quantum computer circuit description in one or more memory or storage devices 462 and transmits the quantum computer circuit description to the computing environment 400 for implementation in the quantum processing unit(s) 402. Still further, the remote computer 400 can store the high-level description the memory or storage devices 462 and transmit the high-level description to the computing environment 400 for compilation and use with the quantum processor(s). In any of these scenarios, results from the computation performed by the quantum processor(s) can be communicated to the remote computer after and/or during the computation process. Still further, the remote computer can communicate with the QP controller(s) 420 such that the quantum computing process (including any compilation and/or QP processor control procedures) can be remotely controlled by the remote computer 460. In general, the remote computer 460 communicates with the QP roller(s) 420 and/or compiler/synthesizer 422 via communication connections 450.

In particular embodiments, the environment 400 can be a cloud computing environment, which provides the quantum processing resources of the environment 400 to one or more remote computers (such as remote computer 460) over a suitable network (which can include the internet).

XII. General Embodiments

This section describes several example embodiments for implementing embodiments of the disclosed technology. The disclosed tools and techniques are not to be construed as limiting in any way, as an one or more of the illustrated method acts can be performed alone or in various other combinations and subcombinations with one another. Further, any one or more of the disclosed method acts can be performed with one or more other method acts disclosed herein.

FIG. 5 is a flowchart of an example method 500 for distilling magic states in a quantum computing device in accordance with embodiments of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

In some embodiments, the methods below are performed (at least in part) by a classical computer configured to communicate with and control a quantum computer. Still further, the method acts can be embodied as computer-executable instructions which when executed by a computer cause the computer to perform the methods.

At 510, a Reed-Muller magic state distillation protocol is generated for creating magic states in the quantum computing device. In particular implementations, the Reed-Muller magic state distillation protocol is for Toffoli gates or controlled-controlled-Z (CCZ) gates. In some implementations, logical vectors implemented by the protocol allow 10 CCZ magic states for 512 qubit code with eighth order error reduction. In certain implementations, the protocol uses R-M stabilizers as shown and described herein.

At 512, the quantum computing device is configured to implement the Reed-Muller magic state distillation protocol.

FIG. 6 is a flowchart of an example method 600 for distilling magic states in a quantum computing device in accordance with embodiments of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

At 610, a magic state distillation protocol for T gates, controlled-S gates, or CCZ gates is generated using a randomized construction process. In certain implementations, the magic state distillation protocol has an asymptotic distillation efficiency $\gamma \to 1$ At 612, the quantum computing device is configured to implement the magic state distillation protocol.

Figure 7:
FIG. 7 is another flowchart of an example method for distilling magic states in a quantum computing device in accordance with embodiments of the disclosed technology.

FIG. 7 is a flowchart of an example method 700 for distilling magic states in a quantum computing device in accordance with embodiments of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

At 710, a magic state distillation protocol for T gates, controlled-S gates, or CCZ gates is generated, wherein the magic state distillation protocol includes level-lifted tri-orthogonal codes for reducing circuit depth. In certain implementations, the magic state distillation protocol is a protocol as disclosed herein (e.g., in Sections VII-X).

At 712, the quantum computing device is configured to implement the magic state distillation protocol.

Figure 8:
FIG. 8 is another flowchart of an example method for distilling magic states in a quantum computing device in accordance with embodiments of the disclosed technology.

FIG. 8 is a flowchart of an example method 800 for distilling magic states in a quantum computing device in accordance with embodiments of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

At 810, a controlled-Z operator using a transversal T gate are measured to measure stabilizers of a CCZ magic state. In certain implementations, the stabilizers of the CCZ magic state achieve a second order error reduction. Further, the stabilizers of the CCZ magic state achieve a fourth order error reduction.

Figure 9:
FIG. 9 is another flowchart of example method for distilling magic states in a quantum computing device in accordance with embodiments of the disclosed technology.

FIG. 9 is a flowchart of an example method 900 for distilling magic states in a quantum computing device in accordance with embodiments of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

At 910, stabilizers of CCZ magic states using one or more transversal CCZ gates are simultaneously measured. In certain implementations, the stabilizers of the CCZ magic state achieve a fourth order error redaction.

Figure 10:
FIG. 10 is another flowchart of an example method for distilling magic states in a quantum computing device in accordance with embodiments of the disclosed technology.

FIG. 10 is a flowchart of an example method 1000 for distilling magic states in a quantum computing device in accordance with embodiments of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

At 1010, a magic state distillation protocol for T gates is generated, wherein the magic state distillation protocol includes punctured Reed-Muller codes. In particular implementations, the punctured Reed-Muller codes comprise any of the Reed-Muller codes as disclosed herein. In some implementations, the punctured Reed-Muller codes comprise any of the punctured higher-order Reed-Muller codes (above first-order) as disclosed herein. In certain implementations, the punctured Reed-Muller codes are selected based on Hamming distances.

At 1012, the quantum computing device is configured to implement the magic state distillation protocol.

Figure 11:
FIG. 11 is yet another flowchart of an example method for distilling magic states in a quantum computing device in accordance with embodiments of the disclosed technology.

FIG. 11 is a flowchart of an example method 1100 for distilling magic states in a quantum computing device in accordance with embodiments of the disclosed technology. The illustrated embodiment should not be construed as limiting, as the disclosed method acts can, in some cases, be performed alone, in different orders, or at least partially simultaneously with one another. Further, any of the disclosed methods or method acts can be performed with any other methods or method acts disclosed herein.

At 1110, a magic state distillation protocol is generated using only $k+n_X$ total qubits. In particular implementations, the magic state distillation protocol is based on a triorthogonal code.

At 1112, the quantum computing device is configured to implement the magic state distillation protocol.

XIII. Concluding Remarks

Having described and illustrated the principles of the disclosed technology with reference to the illustrated embodiments, it will be recognized that the illustrated embodiments can be modified in arrangement and detail without departing from such principles.

What is claimed is:

1. A method for distilling magic states in a quantum computing device, comprising:
generating a magic state distillation protocol for creating magic states in the quantum computing device, wherein the magic state distillation protocol includes (a) Reed-Muller codes, or (b) punctured Reed-Muller codes; and
configuring the quantum computing device to implement the magic state distillation protocol,
wherein the magic state distillation protocol is for Toffoli gates or controlled-controlled-Z (CCZ) gates.

2. The method of claim 1, wherein the magic state distillation protocol includes punctured higher-order Reed-Muller codes.

3. The method of claim 1, wherein the magic state distillation protocol uses Reed-Muller stabilizers.

4. The method of claim 1, wherein the magic state distillation protocol includes punctured Reed-Muller codes, wherein the punctured Reed-Muller codes are selected based on Hamming distances.

5. The method of claim 1 wherein the magic state distillation protocol includes punctured Reed-Muller codes, and wherein the punctured Reed-Muller codes are selected by random puncturing and unpuncturing.

6. The method of claim 1, wherein the method further comprises: measuring a controlled-Z operator using a transversal T gate to measure stabilizers of a CCZ magic state.

7. The method of claim 6, wherein the stabilizers of the CCZ magic state achieve a second order error reduction or a fourth order error reduction.

8. The method of claim 1, further comprising simultaneously measuring stabilizers of CCZ magic states using one or more transversal CCZ gates.

9. A quantum computer system comprising:
a classical computer; and
a quantum computing device implementing a plurality of quoits,
wherein the classical computer is programmed to implement a method for controlling the quantum computing device, the method comprising:
generating a magic state distillation protocol for creating magic states in the quantum computing device, wherein the magic state distillation protocol includes (a) Reed-Muller codes, or (b) punctured Reed-Muller codes, and
configuring the quantum computing device to implement the magic state distillation protocol,
wherein the magic state distillation protocol is for Toffoli gates or controlled-controlled-Z (CCZ) gates.

10. The system of claim 9, wherein the magic state distillation protocol includes punctured higher-order Reed-Muller codes.

11. The system of claim 9, wherein the magic state distillation protocol uses Reed-Muller stabilizers.

12. The system of claim 9, wherein the magic state distillation protocol includes punctured Reed-Muller codes, wherein the punctured Reed-Muller codes are selected based on Hamming distances.

13. The system of claim 9, wherein the magic state distillation protocol includes punctured Reed-Muller codes, and wherein the punctured Reed-Muller codes are selected by random puncturing and unpuncturing.

14. The system of claim 9, wherein the method further comprises measuring a controlled-Z operator using a transversal T gate to measure stabilizers of a CCZ magic state.

15. The system of claim 14, wherein the stabilizers of the CCZ magic state achieve a second order error reduction or a fourth order error reduction.

16. The system of claim 9, wherein the method further comprises simultaneously measuring stabilizers of CCZ magic states using one or more transversal CCZ gates.

* * * * *